United States Patent [19]

Ono

[11] Patent Number: 4,724,535

[45] Date of Patent: Feb. 9, 1988

[54] LOW BIT-RATE PATTERN CODING WITH RECURSIVE ORTHOGONAL DECISION OF PARAMETERS

[75] Inventor: Shigeru Ono, Tokyo, Japan

[73] Assignee: NEC Corporation, Tokyo, Japan

[21] Appl. No.: 723,987

[22] Filed: Apr. 16, 1985

[30] Foreign Application Priority Data

Apr. 17, 1984 [JP] Japan ................................ 59-76793
May 25, 1984 [JP] Japan ................................ 59-105747
Mar. 13, 1985 [JP] Japan ................................ 60-49857

[51] Int. Cl.$^{4}$ .......................... H04B 1/66; G10L 3/02
[52] U.S. Cl. .......................................... 375/122; 381/31
[58] Field of Search .................... 370/118; 375/25, 26, 375/34, 122; 358/138; 381/29, 31

[56] References Cited

PUBLICATIONS

B. S. Atal et al, "A New Model of LPC Excitation for Producing Natural-Sounding Speech at Low Bit Rates", *Proceedings of IASSP, 1982, pp. 614–617.*

John Makhoul, "Linear Prediction: A Tutorial Review", *Proceedings of the IEEE,* vol. 63, No. 4, Apr. 1975, pp. 561–580.

Joel Max, "Quantizing for Minimum Distortion", *IRE Transactions on Information Theory,* Mar. 1960, pp. 7–12.

*Primary Examiner*—Robert L. Griffin
*Assistant Examiner*—Andrew J. Telesz, Jr.
*Attorney, Agent, or Firm*—Sughrue, Mion, Zinn, Macpeak, and Seas

[57] ABSTRACT

Instead of an excitation pulse sequence producing circuit which is used according to prior art in calculating locations of excitation pulses and pulse amplitudes thereof, an excitation pulse sequence parameter producing circuit is used in a low bit-rate pattern coding device in recursively giving delays of the respective pulse locations to a discrete impulse response sequence to provide a system of delayed impulse responses and in transforming the delayed impulse response system into an orthogonal set of set elements. Meanwhile, the pulse locations are determined with element amplitudes or factors calculated for the respective system elements by the use of the system elements and each segment of a discrete pattern signal sequence. The pulse locations and the element amplitudes are used as parameters descriptive of the excitation pulses. Alternatively, the pulse locations are determined one at a time after quantization of each of the recursively determined element amplitudes. Preferably, the discrete impulse response sequence and the segment are weighted in consideration of auditory or like sensual effects. In a counterpart decoder, the pulse amplitudes are calculated by the use of the pulse locations and the system elements which are calculated by using the pulse locations and another parameter sequence which, in turn, is derived in the coding device from the segment in the manner in the art of multi-pulse excitation.

11 Claims, 12 Drawing Figures

FIG I
PRIOR ART

LOW BIT-RATE PATTERN CODING WITH RECURSIVE ORTHOGONAL DECISION OF PARAMETERS

BACKGROUND OF THE INVENTION

This invention relates to a low bit-rate pattern coding method and a device therefor. The low bit-rate pattern coding method or technique is for coding an original pattern signal into an output code sequence at low information transmission rates. The pattern signal may either be a speech or voice signal or a picture signal. The output code sequence is either for transmission through a transmission channel or for storage in a storing medium.

This invention relates also to a method of decoding the output code sequence into a reproduced pattern signal, namely, into a reproduction of the original pattern signal, and to a decoder for use in carrying out the decoding method. The output code sequence is supplied to the decoder as an input code sequence and is decoded into the decoded pattern signal by synthesis. The pattern coding is useful in, among others, speech synthesis. The following description is concerned with speech coding.

Speech coding based on a multi-pulse excitation method is proposed as a low bit-rate speech coding method in an article which is contributed by Bishnu S. Atal et al of Bell Laboratories to Proc. IASSP, 1982, pages 614–617, under the title of "A New Model of LPC Excitation for Producing Natural-sounding Speech at Low Bit Rates." According to the Atal et al article, speech synthesis is carried out by exciting a linear predictive coding (LPC) synthesizer by a sequence or train of excitation or exciting pulses. Instants or locations of the excitation pulses and amplitudes thereof are determined by the so-called analysis-by-synthesis (A-b-S) method. It is believed that the model of Atal et al is prosperous as a model of coding at a bit rate between about 8 and 16 kbit/sec a discrete speech signal sequence which is derived from an original speech signal. The model, however, requires a great amount of calculation in determining the pulse instants and the pulse amplitudes.

In the meanwhile, a "voice coding system" is disclosed in United States Patent Application Ser. No. 565,804 filed Dec. 27, 1983, by Kazunori Ozawa et al for assignment to the present assignee based on three Japanese patent applications which were laid open to the public under Japanese Paent Prepublications (Publications of Unexamined Patent Applications) Nos. 116,793, 116,793, and 116,795 in 1984. The voice or speech coding system of the Ozawa et al patent application is for coding a discrete speech signal sequence of the type described into an output code sequence, which is for use in a decoder in exciting either a synthesizing filter or its equivalent of the type of the linear predictive coding synthesizer in producing a reproduction of the original speech signal as a reproduced speech signal. The discrete speech signal sequence is divisible into segments, such as frames of the discrete speech signal sequence.

In the manner which is described in the above-cited Japanese patent prepublications and will later be described more in detail, the speech coding system of the Ozawa et al patent application comprises a parameter calculator responsive to each segment of the discrete speech signal sequence for calculating a parameter sequence representative of a spectral envelope of the segment. Responsive to the parameter sequence, an impulse response calculator calculates an impulse response sequence which the synthesizing filter has for the segment. In other words, the impulse response calculator calculates an impulse response sequence related to the parameter sequence. An autocorrelator or covariance calculator calculates an autocorrelation or covariance function of the impulse response sequence. Responsive to the segment and the impulse response sequence, a cross-correlator calculates a cross-correlation function between the segment and the impulse response sequence. Responsive to the autocorrelation and the cross-correlation functions, an excitation pulse sequence producing circuit produces a sequence of excitation pulses by successively determining instants and amplitudes of the excitation pulses. A first coder codes the parameter sequence into a parameter code sequence. A second coder codes the excitation pulse sequence into an excitation pulse code sequence. A multiplexer multiplexes or combines the parameter code sequence and the excitation pulse code sequence into the output code sequence.

With the system according to the Ozawa et al patent application, instants of the respective excitation pulses and amplitudes thereof are determined or calculated with a drastically reduced amount of calculation. It is to be noted in this connection that the pulse instants and the pulse amplitudes are calculated assuming that the pulse amplitudes are dependent solely on the respective pulse instants. The assumption is, however, not applicable in general to actual original speech signals, from each of which the discrete speech signal sequence is derived.

An improved low bit-rate speech coding method and a device therefor are revealed in United States Patent Application Ser. No. 626,949 filed July 2, 1984, as an elder or prior patent application by the instant applicant for assignment to the present assignee, based on two Japanese patent applications which were laid open to the public under Japanese Patent Prepublications Nos. 17,500 and 42,800 in 1985. It is possible with the method and the device according to the elder patent application or the last-mentioned Japanese patent prepublications to code an original speech signal into an output code sequence with a small amount of calculation and yet the output code sequence made to faithfully represent the original speech signal.

According to the elder patent application, the sequence of excitation pulses is produced by using the autocorrelation and the cross-correlation functions in recursively determining instants and amplitudes of the excitation pulses with the instant of a currently processed pulse of the excitation pulses determined by the use of the instants and the amplitudes of previously processed pulses of the excitation pulses and with renewal of the amplitudes of the previously processed pulses carried out concurrently with decision of the amplitude of the currently processed pulse by the use of the instants of the previously and the currently processed pulses. Alternatively, the sequence of excitation pulses is produced by using the autocorrelation and the cross-correlation functions in recursively determining instants and amplitudes of the excitation pulses with the instant of a currently processed pulse of the excitation pulses and the amplitudes of previously processed pulses of the excitation pulses and of the currently processed pulsed determined by the use of the instants of the previously processed pulses.

Before coding the pulse amplitudes, it is desirable to quantize each pulse amplitude into a quantized pulse amplitude. This gives rise to a quantization error. In other words, the method and the device of the elder patent application have a quantization characteristic which has a room for improvement.

SUMMARY OF THE INVENTION

It is therefore an object of the present invention to provide a method of coding an original pattern signal into an output code sequence of an information transmission rate of about 16 kbit/sec or less with a small amount of calculation and yet with the output code sequence made to faithfully represent the original pattern signal and to have an excellent quantization characteristic.

It is another object of this invention to provide a device for coding an original pattern signal into an output code sequence of an information transmission rate of about 16 kbit/sec or less with a small amount of calculation and yet with the output code sequence made to faithfully represent the original pattern signal and to have an excellent quantization characteristic.

According to an aspect of this invention, there is provided a method of coding each segment of a descrete pattern signal sequence derived from an original pattern signal into an output code sequence consisting of a first and a second code sequence wherein the second code sequence is equivalent to a sequence of codes representative of a predetermined number of excitation pulses, respectively, which are for use in reproducing the original pattern signal by exciting a synthesizing filter and which have pulse locations in the segment, respectively. The method comprises the steps of: using the segment in calculating a first parameter sequence of refection coefficients; coding the first parameter sequence into the first code sequence; using the first parameter sequence in calculating the discrete impulse responses of the synthesizing filter has; using the segment and the discrete impulse responses in recursively determining the pulse locations by recursively producing a system of delayed impulse responses with the discrete impulse responses given delays, which are equal to the respective pulse locations, by recursively transforming the set of delayed impulse responses into an orthogonal set of set elements which are equal in number to the excitation pulses and for which element amplitudes are defined, respectively, and by recursively determining the element amplitudes; using the recursively determined pulse locations and the recursively determined element amplitudes collectively as a second parameter sequence; and coding the second parameter sequence into the second code sequence.

According to another aspect of this invention, there is provided a method of coding each segment of a discrete pattern signal sequence derived from an original pattern signal into an output code sequence consisting of a first and a second code sequence wherein the second code sequence is equivalent to a sequence of codes representative of a predetermined number of excitation pulses, respectively, which are for use in reproducing the original pattern signal by exciting a synthesizing filter and which have pulse locations in the segment, respectively. The method comprises the steps of: using the segment in calculating a first parameter sequence reflection coefficients; coding the first parameter sequence into the first code sequence; using the first parameter sequence in calculating a sequence of discrete impulse responses which the synthesizing filter has; using the segment and the sequence of discrete impulse responses in recursively determining the pulse locations by recursively producing a system of delayed impulse responses with the discrete impulse responses given delays, which are equal to the respective pulse locations, by recursively transforming the set of delayed impulse responses into an orthogonal set of set elements which are equal in number to the excitation pulses and for which element amplitudes are defined, respectively, by recursively determining the element amplitudes, and by quantizing the recursively determined element amplitudes into quantized element amplitudes; using the recursively determined pulse locations. and the quantized element amplitudes collectively as a second parameter sequence; and coding the second parameter sequence into the second code sequence.

According to still another aspect of this invention, there is provided a method of coding each segment of an original pattern signal into an output code sequence. The method comprises the steps of: generating a predetermined number of signal sequences which can be used in approximating the segment by a linear sum of discrete signals given by multiplying the signal sequences by signal amplitudes defined therefor, respectively; transforming a set of the signal sequences into an orthogonal set of set elements which are equal in number to the signal sequences and for which element amplitudes are defined, respectively; using the segment and the orthogonal system in recursively determining the element amplitudes so as to minimize a difference between the segment and a linear sum of products which are given by multiplying the set elements by the recursively determined element amplitudes, respectively; quantizing the recursively determined element amplitudes and the set elements into quantized element amplitudes and quantized set elements; and using the quantized element amplitudes and the quantized set elements collectively as the output code sequence.

Other objects and other aspects of this invention will become clear as the description proceeds.

DESCRIPTION OF THE PREFERRED EMBODIMENTS

Figure 1:
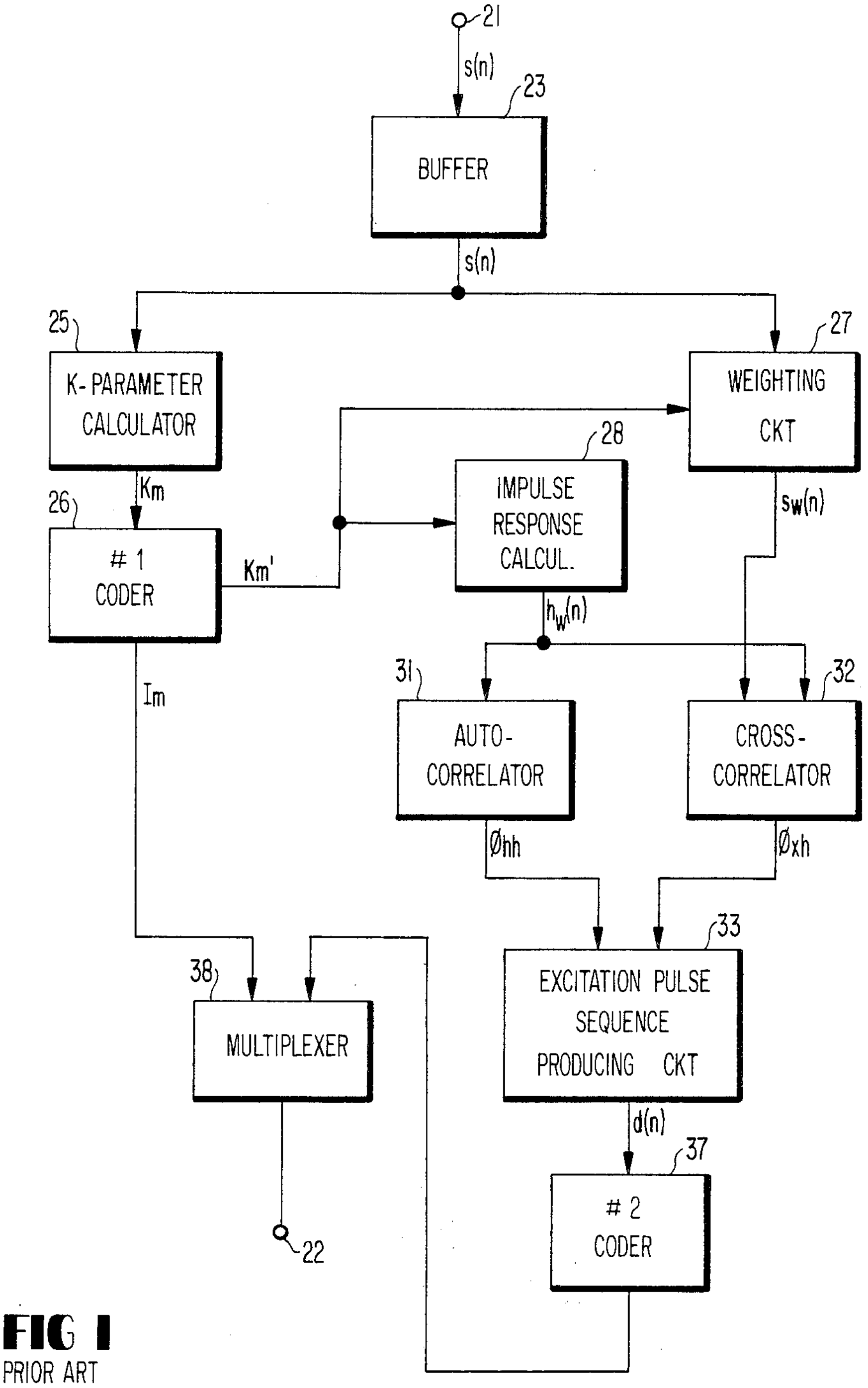
FIG. 1 is a block diagram of a conventional speech coding device.

Referring to FIG. 1, description will be given at first as regards a low bit-rate speech coding device disclosed in the above-referenced Ozawa et al patent application in order to facilitate an understanding of the present invention. In the manner described heretobefore, the device is for use in coding a discrete pattern or speech signal sequence derived from an original pattern or speech signal into an output code sequence which is used in a decoder in reproducing the original pattern or speech signal as a reproduced pattern or speech signal by exciting either a synthesizing filter or its equivalent of the type described in the above-cited Atal et al article as a linear predictive coding synthesizer.

The device has a coder input terminal 21 supplied with the discrete speech signal sequence which is derived by sampling the original speech signal at a sampling frequency of, for example, 8 kHz into speech signal samples and by subjecting the speech signal samples to analog-to-digital conversion. The output code sequence is delivered to a coder output terminal 22.

A buffer memory 23 is for storing each frame of the discrete speech signal sequence. The frame may have a frame length of 20 milliseconds and be called a segment in the manner described hereinabove for the reason which will be described later in the description. It will be assumed that each segment is represented by zeroth through (N−1)-th speech signal samples, where N is equal to one hundred and sixty under the circumstances. The segment will herein be designated by s(n), where n represents zeroth through (N−1)-th sampling instants 0, . . . , n, . . . , and (N−1). It is possible to understand that the sampling instants n's are representative of phases of the segment s(n). Inasmuch as the discrete speech signal sequence is a succession of such segments, the same symbol s(n) is labelled in the figure to the signal line which connects the coder input terminal 21 to the buffer memory 23.

The segment s(n) is delivered from the buffer memory 23 to a K parameter calculator 25 which is for calculating a sequence of K parameters representative of a spectral envelope of the segment s(n). The K parameters are called reflection coefficients in the Atal et al article and will herein be denoted by $K_m$, where m represents a natural number between 1 and the order M of the synthesizing filter, both inclusive. The order M is typically equal to sixteen. The K parameter sequence will alternatively be called a first parameter sequence and be designated by the symbol $K_m$ which is already assigned to the K parameters. It is possible to calculate the K parameters in the manner described in an article which is contributed by J. Makhoul to Proc. IEEE, April 1975, pages 561–580, and which is given a title of "Linear Prediction: A Tutorial Review."

A first or K parameter coder 26 is for coding the first parameter sequence $K_m$ into a first or K parameter code sequence $I_m$ of a predetermined number of quantization bits. The coder 26 may be of the circuitry described in an article contributed by R. Viswanthan et al to IEEE Transactions on Acoustics, Speech, and Signal Processing, June 1975, pages 309–321, and entitled "Quantization Properties of Transmission Parameters in Linear Predictive Systems." The coder 26 furthermore decodes the first parameter code sequence $I_m$ into a sequence of decoded K parameters $K_m'$ which are in correspondence to the respective K parameters $K_m$.

The Atal et al article will briefly be reviewed. An excitation pulse sequence generating circuit generates a sequence of excitation pulses. The excitation pulse sequence will herein be designated by d(n). The number of excitation pulses generated for each segment s(n), is equal to or less than a predetermined positive integer or number K which may be thirty-two. The number of excitation pulses may be equal to four, eight, or sixteen. At any rate, it will be assumed that first, . . . , k-th, . . . , and K-th excitation pulses are generated for each segment s(n). Attention should be directed in this connection to the fact that the first through the K-th excitation pulses are not necessarily located or positioned in this order along the zeroth through the (N−1)-th sampling instants. Attention should be directed also to the fact that the letter k represents an ordinal number given to each excitation pulse. The ordinal numbers k's are indicative of pulse instants at which the respective excitation pulses are located.

Responsive to the first parameter sequence $K_m$ and the excitation pulse sequence d(n), the synthesizing filter produces a sequences of synthesized samples $\tilde{s}(n)$ which are substantially identical with the respective speech signal samples. More particularly, the synthesizing filter converts the K parameters $K_m$ into prediction parameters $a_m$ and calculates the synthesized samples $\tilde{s}(n)$ in accordance with:

$$\tilde{s}(n) = d(n) + \sum_{m=1}^{M} a_m \tilde{s}(n-m). \tag{1}$$

A subtractor subtracts the synthesized sample sequence s(n) from the discrete speech signal sequence $\tilde{s}(n)$ to produce a sequence of errors e(n). Responsive to the first parameter sequence $K_m$, a weighting circuit or filter weights the error sequence e(n) by weights w(n) which are dependent on the frequency characteristic of the synthesizing filter. A sequence of weighted errors $e_w(n)$ is thereby produced in compliance with:

$$e_w(n) = w(n) * e(n),$$

where the symbol * represents the convolution known in mathematics.

When the z-transform of the weights w(n) is represented by W(z), the z-transform is given by:

$$W(z) = \left(1 - \sum_{m=1}^{M} a_m z^{-m}\right) \Big/ \left(1 - \sum_{m=1}^{M} a_m r^m z^{-m}\right),$$

where r represents a constant which has a value preselected between 0 and 1, both inclusive. The constant r determines the frequency characteristic of the z-transform in the manner which will be exemplified in the following.

By way of example, let the constant r be equal to unity. The z-transform W(z) becomes identically equal to unity and has a flat frequency characteristic. When the constant r is equal to zero, the z-transform W(z) gives an inverse of the frequency characteristic of the synthesizing filter. In the manner discussed in detail in the Atal et al article, selection of the value of the constant r is not critical. For the sampling frequency of the above-described 8 kHz, 0.8 may typically be selected for the constant r. The weights w(n) are for minimizing an auditory sensual difference between the original speech signal and the reproduced speech signal.

The weighted error sequence $e_w(n)$ is stored for each segment s(n) and is used in calculating an error power J which is defined by the electric power of the weighted errors stored. In other words, the error power J is defined by:

$$J = \sum_{n=0}^{N-1} [e_w(n)]^2,$$

and is fed back to the synthesizing filter. The instants or locations of the respective excitation pulses d(n) and amplitudes thereof are determined so as to minimize the error power J. According to the analysis-by-synthesis method, the instants and the amplitudes of the excitation pulses d(n), namely, the pulse instants and pulse amplitudes, are determined through a loop comprising a generator for the excitation pulse sequence d(n), a calculator for the error power J, and a circuit for adjusting the pulse instants and the pulse amplitudes so as to minimize the error power J.

In FIG. 1, the segment s(n) and the decoded K parameter sequence $K_m'$ therefor are fed to a weighting circuit 27. Responsive to the decoded K parameter sequence $K_m'$, the segment s(n) is weighted by the weights w(n) into a weighted segment $s_w(n)$ which will presently be described. The weighting circuit 27 is similar to the weighting circuit used by Atal et al except that the weights w(n) are given to each segment s(n) rather than to the errors e(n). The decoded K parameter sequence $K_m'$ is moreover fed to an impulse response calculator 28 and is used therein in calculating a sequence of impulse responses h(n) which the synthesizing filter has for the segment s(n). As the case may be, the impulse responses h(n) are referred to herein as discrete impulse responses for the reason which will be understood from the following.

It is preferred that the impulse response calculator 28 be a weighted impulse response calculator for use in calculating a sequence of weighted impulse responses $h_w(n)$ which will shortly be described. Although the impulse response calculator 28 will be so called in the following description, it will be presumed that the impulse response calculator 28 produces the weighted impulse response sequence $h_w(n)$. If desired, either the elder patent application or the Ozawa et al patent application should be referred to as regards the detailed structure of the impulse response calculator 28.

For the low bit-rate speech coding device according to the Ozawa et al patent application, the sequence of the first through the K-th excitation pulses d(n) of the type described above, is represented as follows for each segment s(n) by using the Kronecker's delta:

$$d(n) = \sum_{k=1}^{K} g_k \delta(n, m_k),$$

where $g_k$ and $m_k$ are representative of the pulse amplitude and the pulse instant or location of the k-th excitation pulse. The synthesized sample sequence $\bar{s}(n)$ is perfunctorily given by Equation (1) also in this event.

It is possible by definition to represent the error power J by:

$$J = \sum_{n=0}^{N-1} [(s(n) - \tilde{s}(n)) * w(n)]^2, \tag{2}$$

and furthermore by:

$$J=[S(z)W(z)-\tilde{S}(z)W(z)]^2,$$

where S(z) and $\tilde{S}(z)$ are representative of z-transforms of the discrete speech signal sequence s(n) and of the synthesized sample sequence $\bar{s}(n)$. From Equation (1), the z-transform $\tilde{S}(z)$ is given by:

$$\tilde{S}(n)=H(z)D(z), \tag{3}$$

where H(z) represents the z-transform of the synthesizing filter for the segment s(n) and is given by:

$$H(z) = 1/\left(1 + \sum_{m=1}^{M} a_m z^{-m}\right),$$

and where D(z) represents the z-transform of the excitation pulse sequence d(n). By substituting Equation (3) into Equation (2):

$$J=[S(z)W(z)-H(z)W(z)D(z)]^2. \tag{4}$$

The inverse z-transforms of the z-transforms [S(z)W(z)] and [H(z)W(z)] will be written by $s_w(n)$ and $h_w(n)$. The inverse z-transforms $s_w(n)$ and $h_w(n)$ are called the weighted segment and the weighted impulse response sequence hereinabove. In other words, the inverse z-transforms are:

$$s_w(n)=s(n)*w(n)$$

and $$h_w(n)=h(n)*w(n),$$

where h(n) represents the above-described impulse response sequence. The weighted segment $s_w(n)$ is the segment s(n) adjusted in consideration of the frequency characteristic of the synthesizing filter. The weighted impulse response sequence $h_w(n)$ is what is had by the synthesizing filter and is adjusted in consideration of the frequency characteristic thereof. In other words, the weighted impulse response sequence $h_w(n)$ represents an impulse response which a cascade connection of the synthesizing filter and the weighting circuit has for the segment s(n) under consideration.

Equation (4) is rewritten into:

$$J = \sum_{n=0}^{N-1} \left[ s_w(n) - \sum_{k=1}^{K} g_k h_w(n - m_k) \right]^2, \tag{5}$$

where the weighted impulse responses $h_w(n)$ are given delays which are equal to the pulse instants $m_k$'s of the respective excitation pulses. The weighted and then delayed impulse responses $h_w(n)$ will be referred to merely as delayed impulse response.

It is already described in conjunction with the model according to Atal et al that the instants $m_k$ (or $m_k$'s) and the amplitudes $g_k$ (or $g_k$'s) of the first through the K-th excitation pulses should be determined so as to minimize the error power J. Equation (5) is therefore partially differentiated by the pulse amplitudes $g_k$ to provide partial derivatives.

When the partial derivatives are put equal to zero, the following equations result for the ordinal numbers k's of 1 through K:

$$\phi_{xh}(m_k) = \sum_{i=1}^{k} g_i \phi_{hh}(m_i, m_k), \quad (6)$$

where $\phi_{xh}(m_k)$ and $\phi_{hh}(m_i, m_k)$ are representative of a cross-correlation function between the weighted segment $s_w(n)$ and the weighted impulse response sequence $h_w(n)$ and an autocorrelation or covariance function of the weighted impulse response sequence $h_w(n)$. More specifically:

$$\phi_{xh}(m_k) = \phi_{hx}(-m_k) = \sum_{n=0}^{N-1} s_w(n) h_w(n - m_k) \quad (7)$$

and $$\phi_{hh}(m_i, m_k) = \sum_{n=0}^{N-|m_i-m_k|-1} h_w(n - m_i) h_w(n - m_k). \quad (8)$$

In the Ozawa et al patent application, the amplitude $g_k$ of the k-th excitation pulse is regarded as a function of only the instant $m_k$ of the k-th excitation pulse in Equations (6). In other words, the pulse instant $m_k$ is determined so as to minimize the absolute values $|g_k|$. The pulse amplitude $g_k$ is determined by the maximum of the absolute values $|g_k|$. It is therefore convenient to rewrite Equations (6) into:

$$g_l = \phi_{xh}(m_l)/\phi_{hh}(m_l, m_l)$$
for the first excitation pulse and:
$$g_k = \left[ \phi_{xh}(m_k) - \sum_{i=1}^{k-1} g_i \phi_{hh}(m_i, m_k) \right] / \phi_{hh}(m_k, m_k) \quad (9)$$
for the second and subsequent excitation pulses.

In FIG. 1, the weighted impulse response sequence $h_w(n)$ is delivered to an autocorrelator or covariance calculator 31 and is used in calculating an autocorrelation or covariance function or coefficient $\phi_{hh}(m_i, m_k)$ of the weighted impulse response sequence $h_w(n)$ in compliance with Equation (7). On the righthand side of Equation (7), a pair of arguments $(n-m_i)$ and $(n-m_k)$ represents each of various pairs of the sampling instants or phases which are given delays of the pulse instants $m_i$ and $m_k$ relative to the zeroth through the (N−1)-th sampling instants. The weighted segment $s_w(n)$ and the weighted impulse response sequence $h_w(n)$ are delivered to a cross-correlator 32 and are used in calculating a cross-correlation function or coefficient $\phi_{xh}(m_k)$ therebetween in accordance with Equation (8). If desired, the elder patent application should be referred to as regards the autocorrelator 31 and the cross-correlator 32.

The autocorrelation and the cross-correlation functions $\phi_{hh}(m_i, m_k)$ and $\phi_{xh}(m_k)$ are delivered to an excitation pulse sequence producing circuit 33 which corresponds to the excitation pulse sequence generating circuit used by Atal et al. The excitation pulse sequence producing circuit 31 is, however, quite different in operation from the excitation pulse sequence generating circuit and is for producing a sequence of excitation pulses d(n) in response to the autocorrelation and the cross-correlation functions $\phi_{hh}(m_i, m_k)$ and $\phi_{xh}(m_k)$ according to Equations (9).

A second or excitation pulse instant and amplitude coder 37 is for coding the excitation pulse sequence d(n) to produce an excitation pulse (sequence) code sequence which is referred herein as a second code sequence or second parameter code sequence. Inasmuch as the excitation pulse sequence d(n) is given by the instants $m_k$ and the amplitudes $g_k$ of the excitation pulses, the second coder 37 codes the pulse instants $m_k$ and the pulse amplitudes $g_k$ into a sequence of pulse instant codes and another sequence of pulse amplitude codes. On so doing, it is possible to resort to known methods. By way of example, the pulse amplitudes $g_k$ are normalized into normalized values by using, for example, each of the maximum ones of the pulse amplitudes for the respective segments as a normalizing factor. Alternatively, the pulse amplitudes $g_k$ may be coded by a method described by J. Max in IRE Transactions on Information Theory, March 1960, pages 7-12, under the title of "Quantization for Minimum Distortion." The pulse instants $m_k$ may be coded by the run length encoding known in the art of facsimile signal transmission. More particularly, the pulse instants $m_k$ are coded by representing a "run length" between two adjacent excitation pulses by a code representative of the run length. A multiplexer 38 multiplexes or combines the first parameter code sequence $I_m$ delivered from the first coder 26 and the second parameter code sequence sent from the second coder 37 into the output code sequence.

Figure 2:
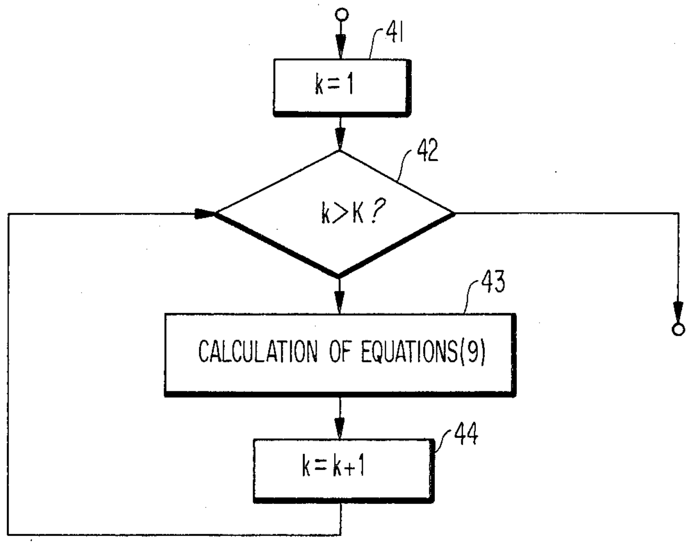
FIG 2 PRIOR ART
FIG. 2 is a flow chart for use in describing operation of an excitation pulse sequence producing circuit used in the coding device illustrated in FIG. 1.

Turning to FIG. 2, the instants $m_k$ and the amplitudes $g_k$ of the excitation pulses are decided by the excitation pulse sequence producing circuit 33 by at first initializing the ordinal number k to 1 at a first step 41. The ordinal number k is compared at a second step 42 with the predetermined positive integer K. If the ordinal number k becomes greater than the predetermined positive integer K, the process comes to an end for the segment being processed. If not, Equations (9) are calculated for the respective ordinal numbers k's at a third step 43. One is added to the ordinal number k at a fourth step 44. Details of the process are described in the elder patent application together with an example of the excitation pulse sequence producing circuit 33.

Figure 3:
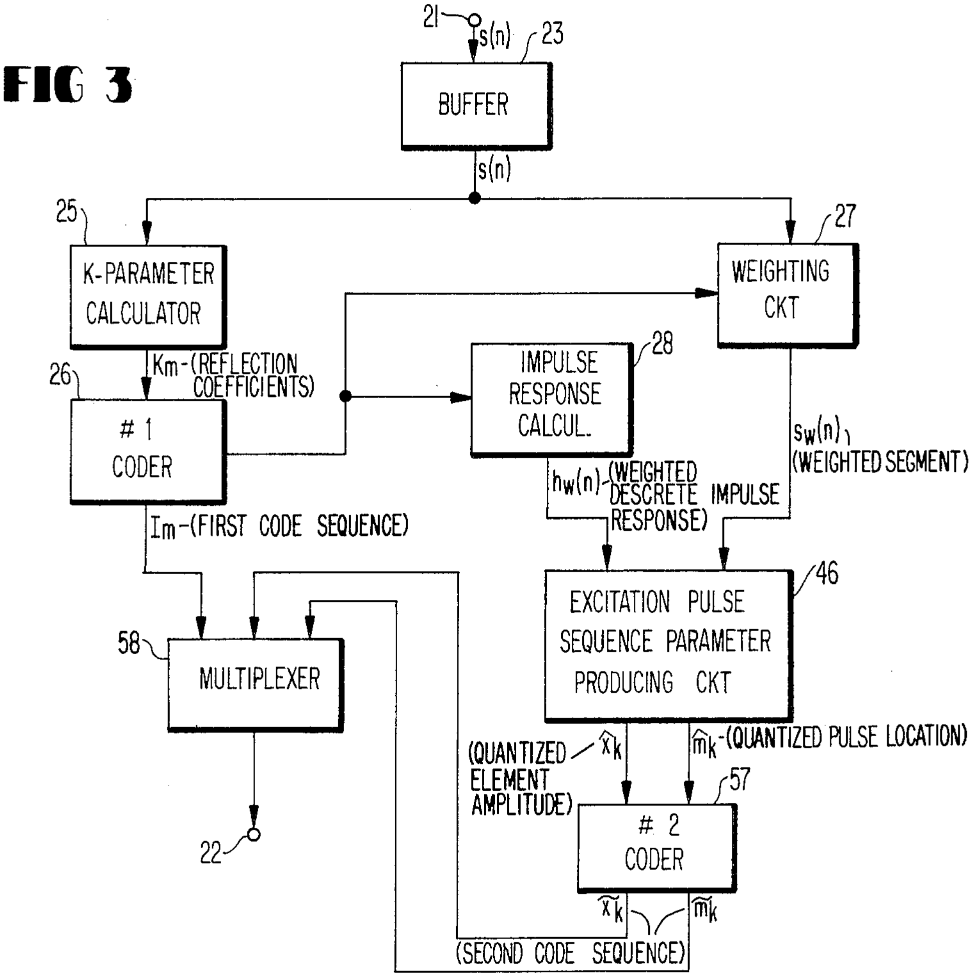
FIG. 3 is a block diagram of a speech coding device according to a first embodiment of the instant invention.

Referring now to FIG. 3, a low bit-rate pattern coding device according to a first embodiment of this invention is for use in coding a discrete pattern signal sequence into an output code sequence. The discrete pattern signal sequence is derived from an original pattern signal in the manner described before in connection with an original speech signal. The output code sequence is for use as an input code sequence in a decoder, which decodes the input code sequence into a reproduced pattern signal, namely, into a reproduction of the original pattern signal.

The coding device will be described with a discrete speech signal sequence s(n) of the above-described type used as a representative of the discrete pattern signal. The coding device has coder input and output terminals 21 and 22. The coder input terminal 21 is supplied with the discrete speech signal sequence s(n). The output code sequence is delivered to the coder output terminal 22. The coding device comprises a buffer memory 23, a K parameter calculator 25, a first or K parameter coder 26, a weighting circuit 27, and a (weighted) impulse response calculator 28 which are similar to the elements 23 and 25 through 28 described before in conjunction with FIG. 1.

An excitation pulse sequence parameter producing circuit 46 is supplied with the weighted segment $s_w(n)$ from the weighting circuit 27 and the weighted impulse response sequence $h_w(n)$ from the impulse response calculator 28. In accordance with a novel algorithm, the excitation pulse sequence parameter producing circuit 46 produces a second parameter sequence, namely, a sequence of excitation pulse (sequence) parameters descriptive of an excitation pulse sequence which is designated by d(n) as before and is representative of the discrete speech signal sequence s(n). The novel algorithm will be described in the following.

When the partial derivatives of Equation (5) are put equal to zero, the following equations are directly obtained for the ordinal numbers k's of 1 through K instead of Equation (6):

$$\sum_{n=0}^{N-1} s_w(n)h_w(n - m_k) = \sum_{i=1}^{k} g_i h_w(n - m_i)h_w(n - m_j). \tag{10}$$

Let a scaler or inner product of two functions f(n) and g(n) be represented by $<f(n), g(n)>$, namely:

$$<f(n), g(n)> = \sum_{n=0}^{N-1} f(n)g(n).$$

Incidentally, the square norm is:

$$\|f(n)\|^2 = <f(n), f(n)> = \sum_{n=0}^{N-1} f^2(n).$$

In this event, Equations (10) are rewritten into:

$$<s_w(n), h_w(n - m_k)> = \sum_{i=1}^{k} g_i <h_w(n - m_i), h_w(n - m_j)>, \tag{11}$$

by using a scalar product of the weighted impulse response of a pair of arguments or phases $(n-m_i)$ and $(n-m_j)$ which may or may not be equal to each other.

By substituting Equations (11) into Equation (5):

$$J = <s_w(n), s_w(n)> - \sum_{k=1}^{K} g_i <s_w(n), h_w(n - m_k)>. \tag{12}$$

In Equation (12), a set or sequence of delayed impulse responses $\{h_w(n-m_k)\}$ does not belong to an orthogonal system or group. More specifically:

$$<h_w(n-m_i), h_w(n-m_j)> \neq 0,$$

when $i \neq j$. The sequence of delayed impulse responses $\{h_w(n-m_k)\}$ is therefore recursively transformed into an orthogonal set or sequence of first through K-th set or sequence elements $\{y_k(n)\}$ in order to recursively determine the pulse instants or location $m_k$ which minimize the error power J of Equation (5) or (12). The symbol $y_k(n)$ is used merely for convenience of print instead of another symbol $\eta_k(n)$ often used in the art.

When the Schmidt orthogonalization is applied to the recursive transformation, first through k-th and subsequent equations are obtained as follows for the set or sequence elements $y_k(n)$ of the ordinal numbers k of 1 through K:

$$\left.\begin{aligned}
y_1(n) &= h_w(n - m_1),\\
y_2(n) &= h_w(n - m_2)\\
&\quad - y_1(n) <h_w(n - m_2), y_1(n)>/<y_1(n), y_1(n)>\\
&= h_w(n - m_2) - v_{21}y_1(n),\\
y_3(n) &= h_w(n - m_3)\\
&\quad - y_2(n) <h_w(n - m_3), y_2(n)>/<y_2(n), y_2(n)>\\
&\quad - y_1(n) <h_w(n - m_3), y_1(n)>/<y_1(n), y_1(n)>\\
&= h_w(n - m_3) - v_{32}y_2(n) - v_{31}y_1(n), \ldots,\\
y_k(n) &= h_w(n - m_k)\\
&\quad - \sum_{i=1}^{k-1} [y_i(n)\\
&\quad \times <h_w(n - m_k), y_i(n)>/<y_i(n), y_i(n)>]\\
&= h_w(n - m_k) - \sum_{i=1}^{k-1} v_{ki}y_i(n), \text{ and} \ldots,
\end{aligned}\right\} \tag{13}$$

where $v_{ki}$ represents transformation coefficients for the ordinal number k representative of each sequence element $y_k(n)$ and for other ordinal numbers i's which are less than the first-mentioned ordinal number k. In other words, the transformation coefficients $v_{ki}$ are given by:

$$v_{ki} = <h_w(n - m_k), y_i(n)> \div <y_i(n), y_i(n)>. \tag{14}$$

When the k-th equation of Equations (13) is being processed, the k-th excitation pulse is a currently processed pulse of the first through the K-th excitation pulses. The first through the (k−1)-th excitation pulses are previously processed pulses of the excitation pulses. The Schmidt orthogonalization is equivalent to rejection or exclusion of those correlations of the delayed impulse responses $\{h_w(n-m_i)\}$ for the previously processed pulses from the delayed impulse response $h_w(n-m_k)$ for the currently processed pulse which are related to the latter.

The orthogonal sequence $\{y_k(n)\}$ has an orthogonal relation such that:

$$<y_i(n), y_j(n)> = 0. \tag{15}$$

when $i \neq j$. The error power J is therefore given by:

$$J = <s_w(n), s_w(n)> - \sum_{k=1}^{K} >s_w(n), y_k(n)>^2 \div <y_k(n), y_k(n)>, \tag{16}$$

if the weighted segment $s_w(n)$ is approximated by the orthogonal sequence $\{y_k(n)\}$ according to linear least square approximation.

A scalar product $<s_w(n), y_k(n)>$ of the weighted segment $s_w(n)$ and the sequence element $y_k(n)$ used in Equation (16) will now be written by $x_k$, which is often written by $\xi_k$ in the art. That is:

$$x_k = <s_w(n), y_k(n)>. \tag{17}$$

The sequence $y_k(n)$ has an element amplitude or factor which is herein called an "element amplitude" and may be defined by the scalar product $x_k$. With the use of the scalar product $x_k$ as the element amplitude, Equation (16) is rewritten into:

$$J = \langle s_w(n), y_k(n)\rangle - \sum_{k=1}^{K} x_k^2/\langle y_k(n), y_k(n)\rangle. \tag{18}$$

In the excitation pulse sequence parameter producing circuit 46, the pulse instants $m_k$'s of the respective excitation pulses are determined or calculated in compliance with Equations (13) and (18). More specifically, the k-th excitation pulse is selected as the currently processed pulse of the excitation pulses after the first through the (k−1)-th excitation pulses are already dealt with as the previously processed pulses of the excitation pulses. The pulse instant $m_k$ of the currently processed pulse is determined so as to minimize the error power J of Equation (18). This is carried out so as to maximize the k-th term in the summation on the righthand side of Equation (18), namely:

$$x_{kk}^2/\langle y_k(n), y_k(n)\rangle, \tag{19}$$

after the pulse instants $m_1$ through $m_{k-1}$ and the element amplitudes $x_1$ through $x_{k-1}$ are already calculated for the previously processed pulses in accordance with Equations (13) and (18).

In the manner which is so far described and will later be described with reference to a flow chart, each pulse instant $m_k$ and each element amplitude $x_k$ given by a scalar product of the weighted segment $s_w(n)$ and the sequence element $y_k(n)$ are calculated recursively for the ordinal numbers k's of 1 through K. The pulse instants $m_k$'s and the element amplitudes $x_k$'s are quantized into quantized pulse instants or locations $m_k$'s of a certain number of quantization bits and quantized element amplitudes $\hat{x}_k$'s which are preferably of a predetermined number of quantization bits per unit element amplitude for the element amplitudes $x_k$'s. The quantized pulse instants $\hat{m}_k$'s and the quantized element amplitudes $\hat{x}_k$'s for the ordinal numbers k's of 1 through K are used as the excitation pulse sequence parameters. It will now be appreciated that the element amplitudes $x_k$'s are used instead of the pulse amplitudes $g_k$'s which are used according to the Ozawa et al and the elder patent applications. The pulse instant $m_k$ of the currently processed pulse of the excitation pulses is optimally determined by Formula (19) in consideration of the pulse instants $m_1$ through $m_{k-1}$ of the previously processed pulses of the excitation pulses.

Figure 4:
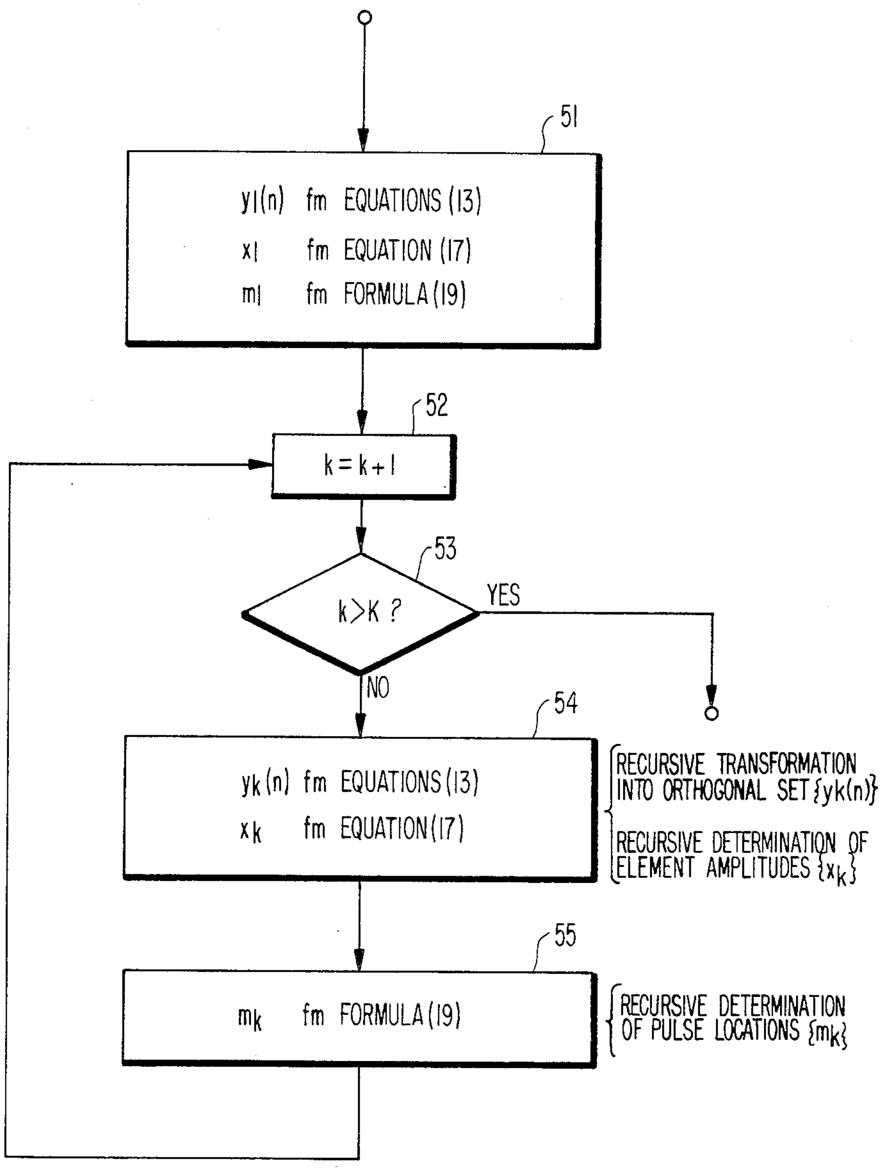
FIG. 4 is a flow chart for use in describing operation of an excitation pulse sequence parameter producing circuit used in the coding device depicted in FIG. 3.

Turning to FIG. 4 for a short while, the excitation pulse sequence parameter producing circuit 46 processes or deals with the weighted segments $s_w(n)$ and the weighted impulse responses $h_w(n)$ as follows. At a first step 51, Equations (13) and (17) and Formula (19) are initialized. More particularly, the ordinal number k is rendered equal to unity so as to select the first excitation pulse as the currently processed pulse. No previously processed pulse is present at this instant. The first sequence element $y_1(n)$ is obtained in accordance with the first equation of Equations (13). Equation (17) is calculated to obtain the element amplitude $x_1$ given for the first sequence element $y_1(n)$ by a scalar product of the weighted segment $s_w(n)$ and the first sequence element $y_1(n)$. Formula (19) is maximized to determine the pulse instant $m_1$ of the currently processed pulse.

At a second step 52, one is added to the ordinal number k. In the manner which will shortly become clear, the second and subsequent excitation pulses are successively selected as the currently processed pulses one at a time. At a third step 53, the successively increased ordinal number k is compared with the predetermined positive integer K. If the ordinal number k exceeds the predetermined positive integer K, the process comes to an end for the segment being processed.

If not, the process proceeds forward to a fourth step 54. Let the k-th excitation pulse be the currently processed pulse. At this instant, the first through the (k−1)-th excitation pulses are the previously processed pulses. The pulse instants $m_1$ through $m_{k-1}$, the first through the (k−1)-th sequence elements $y_1(n)$ to $y_{k-1}(n)$, and the element amplitudes $x_1$ through $x_{k-1}$ thereof are already determined. The k-th sequence element $y_k(n)$ is obtained by the k-th equation of Equations (13). Equation (17) is calculated to get the element amplitude $x_k$ by a scalar product of the weighted segment $s_w(n)$ and the k-th sequence element $y_k(n)$. At a fifth step 55, Formula (19) is maximized to determine the pulse instant $m_k$ of the currently processed pulse. The fifth step 55 proceeds back to the second step 52. It will now be obvious that the excitation pulse sequence parameter producing circuit 46 is readily implemented by a microprocessor.

Turning back to FIG. 3, a second or excitation pulse sequence parameter coder 57 codes the quantized element amplitudes $\hat{x}_k$'s and the quantized pulse instants $\hat{m}_k$'s into a sequence of element amplitude codes $\bar{x}_k$ and another sequence of pulse instant codes $\bar{m}_k$. The element amplitude code and the pulse instant or location code sequences $\bar{x}_k$ and $\bar{m}_k$ will collectively be called a second parameter or excitation pulse parameter sequence. A multiplexer 58 is for multiplexing or combining the first parameter code sequence $I_m$ and the second parameter code sequence into the output code sequence.

The second parameter coder 57 may carry out the encoding in any one of the known methods. It is, however, important on coding the element amplitudes $\{x_k\}$ that the decoder be informed of the order in which the delayed impulse response sequence $\{h_w(n-m_k)\}$ is recursively transformed into the orthogonal sequence $\{y_k(n)\}$.

For example, the element amplitudes $\{x_k\}$ should successively be quantized and coded after the element amplitudes are normalized by a normalizing factor which is equal to the maximum of a set of absolute values $\{|x_k|\}$ in each segment in the manner described before in connection with the second coder 37 used by Ozawa et al. Alternatively, vector quantization should be applied to the element amplitudes $\{x_k\}$. In either event, the pulse instants $\{m_k\}$ may be subjected to the above-described run length encoding in the order corresponding to encoding of the element amplitudes.

As a further alternative, the element amplitudes $\{x_k\}$ may be coded and decoded in consideration of the fact that Formula (19) usually has a greater value when the ordinal number k is smaller. More specifically, the pulse instants $\{m_k\}$ may be coded in the order which is convenient for the encoding. The element amplitudes $\{x_k\}$ should be coded in this event in the order in which the pulse instants are coded. In the decoder, the element amplitude codes $\bar{x}_k$'s should be rearranged in the order of their respective magnitudes. This gives the order of the ordinal numbers k's and makes it possible to rearrange the pulse instant codes $\bar{m}_k$'s. It should be noted in this connection that the element amplitudes may happen to have the same absolute value for two consecutive ordinal numbers, namely:

$$|x_i| = |x_{i-1}|.$$

It is therefore desirable to code the signs of the respective element amplitudes $\{x_k\}$.

Figure 5:
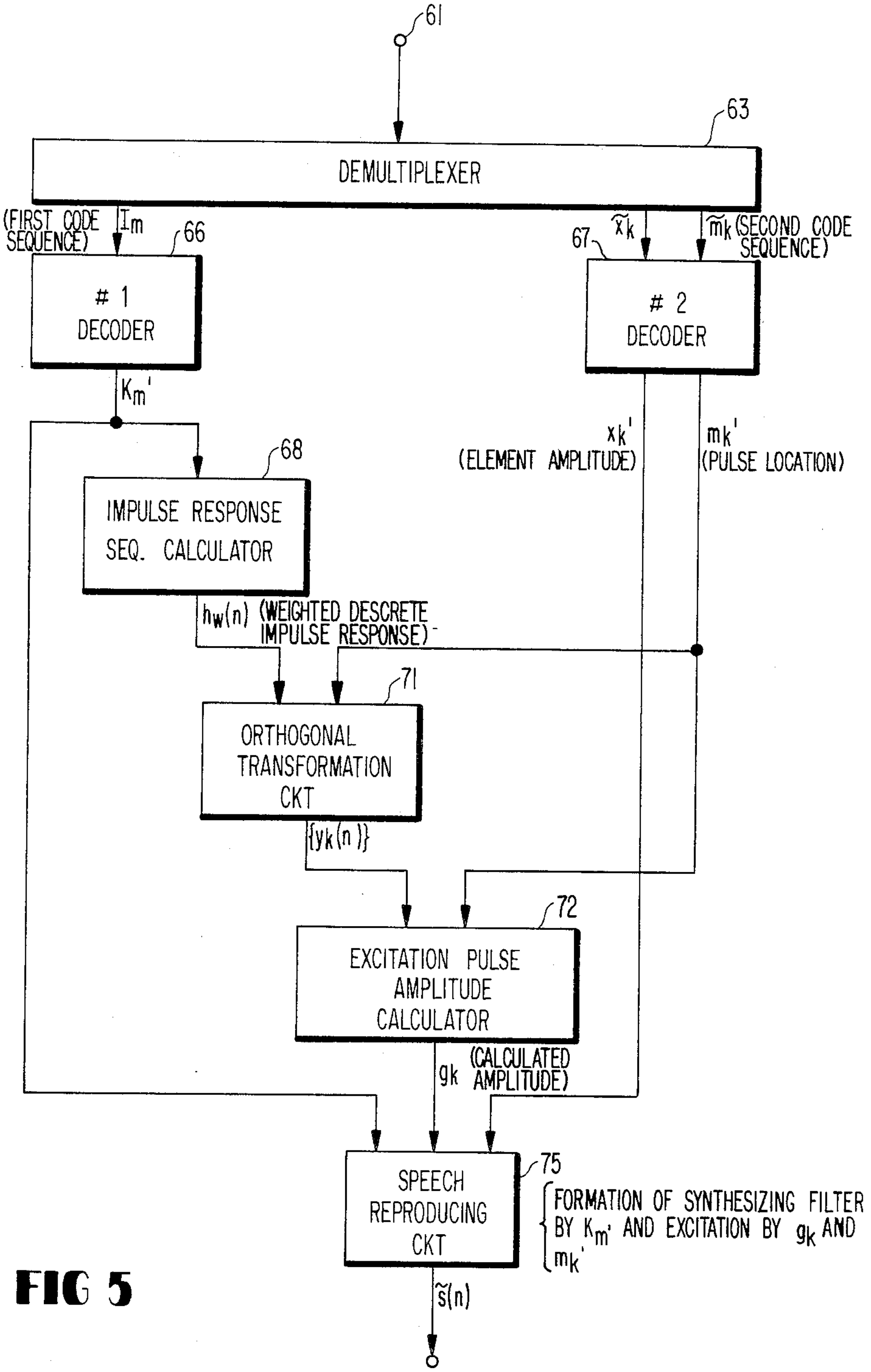
FIG. 5 is a block diagram of a decoder for use as a counterpart of the coding device shown in FIG. 3.

Referring to FIG. 5, a decoder will be described which is for use in decoding the input code sequence into the reproduced pattern or speech signal. The decoder has decoder input and output terminals 61 and 62. The input code sequence is obtained at the decoder input terminal 61 from the output code sequence produced by a counterpart coding device. The reproduced speech signal is delivered to the decoder output terminal 62.

A demultiplexer 63 is for demultiplexing the input code sequence into the first parameter code sequence $I_m$ and the second parameter code sequence which consists of the pulse instant or location code sequence $\bar{\bar{m}}_k$ and the element amplitude code sequence $\bar{\bar{x}}_k$. A first parameter decoder 66 decodes the first parameter code sequence $I_m$ into a sequence of decoded K parameters, namely, into a reproduction of the first parameter sequence $K_m'$. In the manner described in the Ozawa et al and the elder patent applications, the first parameter decoder 66 may comprise an address generator and a read-only memory. On the other hand, a second parameter decoder 67 decodes the pulse instant code and the element amplitude code sequences $\bar{\bar{m}}_k$ and $\bar{\bar{x}}_k$ into a reproduced sequence of pulse instants or locations $m_k'$ and another reproduced sequence of element amplitudes $x_k'$. The second parameter decoder 67 may be similar in structure to the first parameter decoder 66.

Reponsive to the reproduction of the first parameter sequence $K_m'$, an impulse response sequence calculator 68 calculates the weighted impulse response sequence $h_w(n)$. The impulse response sequence calculator 68 is similar to the impulse response calculator 28 used in the counterpart coding device. The weighted impulse response sequence $h_w(n)$ and the reproduced sequence of the pulse instants $m_k'$ are delivered to an orthogonal transformation circuit 71 which may be a microprocessor. The orthogonal transformation circuit 71 recursively reproduces the sequence elements of the orthogonal sequence $\{y_k(n)\}$ in accordance with Equation (13). At the same time, the orthogonal transformation circuit 71 calculates the transformation coefficients $\{v_{ki}\}$ in compliance with Equations (14). Together with the reproduced sequence of the pulse instants $m_k'$, the sequence elements and the transformation coefficients are delivered to an excitation pulse amplitude calculator 72 which may again be a microprocessor. The amplitude calculator 72 calculates the pulse amplitudes $\{g_k\}$ of the first through the K-th excitation pulses as follows.

By comparing Equation (12) with Equation (16), a relation is obtained such that:

$$\sum_{k=1}^{K} g_k \langle s_w(n), h_w(n-m_k)\rangle = \sum_{k=1}^{K} \langle s_w(n), y_k(n)\rangle^2 / \langle y_k(n), y_k(n)\rangle. \quad (20)$$

On the other hand, a set of simultaneous equations:

$$\begin{bmatrix} 1 & & & & 0 \\ v_{21} & 1 & & & \\ v_{31} & v_{32} & 1 & & \\ \cdot & & & & \\ \cdot & & & & \\ v_{K1} & v_{K2} & v_{K3} & \ldots & 1 \end{bmatrix} \begin{bmatrix} y_1(n) \\ y_2(n) \\ y_3(n) \\ \cdot \\ \cdot \\ y_K(n) \end{bmatrix} = \begin{bmatrix} h_w(n-m_1) \\ h_w(n-m_2) \\ h_w(n-m_3) \\ \cdot \\ \cdot \\ h_w(n-m_K) \end{bmatrix} \quad (21)$$

results from Equations (13). By substituting Equations (21) into Equation (20), it is possible to obtain:

$$\sum_{i=1}^{k} \sum_{k=1}^{K} g_k v_{ki} \langle s_w(n), y_i(n)\rangle = \sum_{k=1}^{K} \langle s_w(n), y_k(n)\rangle^2 / \langle y_k(n), y_k(n)\rangle, \quad (22)$$

because $v_{ii}=1$ and, when $i<j$, $v_{ij}=0$. By comparing both sides of Equations (22):

$$\begin{bmatrix} 1 & & & & 0 \\ v_{21} & 1 & & & \\ \cdot & & & & \\ \cdot & & & & \\ v_{K1} & v_{K2} & v_{K3} & \ldots & 1 \end{bmatrix} \begin{bmatrix} g_1 \\ g_2 \\ \cdot \\ \cdot \\ g_K \end{bmatrix} = \begin{bmatrix} \langle s_w(n), y_1(n)\rangle / \langle y_1(n), y_1(n)\rangle \\ \langle s_w(n), y_2(n)\rangle / \langle y_2(n), y_2(n)\rangle \\ \cdot \\ \cdot \\ \langle s_w(n), y_K(n)\rangle / \langle y_K(n), y_K(n)\rangle \end{bmatrix}.$$

Therefore, the pulse amplitudes $\{g_k\}$ are given as follows by using the element amplitudes $\{x_k\}$ together with the transformation coefficients $v_{ki}$'s and the sequence elements $y_k(n)$'s:

$$\begin{bmatrix} g_1 \\ g_2 \\ \cdot \\ \cdot \\ g_K \end{bmatrix} = \begin{bmatrix} 1 & v_{21} & v_{31} \ldots & v_{K1} \\ & 1 & v_{32} \ldots & v_{K2} \\ & & & \cdot \\ & 0 & & \cdot \\ & & & 1 \end{bmatrix} \times \begin{bmatrix} x_1 / \langle y_1(n), y_1(n)\rangle \\ x_2 / \langle y_2(n), y_2(n)\rangle \\ \cdot \\ \cdot \\ x_K / \langle y_K(n), y_K(n)\rangle \end{bmatrix}. \quad (23)$$

In FIG. 5, a speech reproducing circuit 75 is supplied with the reproduction of the first parameter sequence $K_m'$ from the first parameter decoder 66 and calculates a synthesizing filter. Stated otherwise, the speech reproducing circuit 75 serves as a synthesizing filter in response to the reproduction of the first parameter sequence $K_m'$. An excitation pulse sequence is defined for the synthesizing filter by the pulse amplitudes $\{g_k\}$ calculated by the excitation pulse amplitude calculator 72 for the respective excitation pulses and the reproduced sequence of pulse instants $\{m_k'\}$ sent therefor from the second parameter decoder 67. The excitation pulse sequence makes the synthesizing filter reproduce the original speech signal as the reproduced speech signal.

Figure 6:
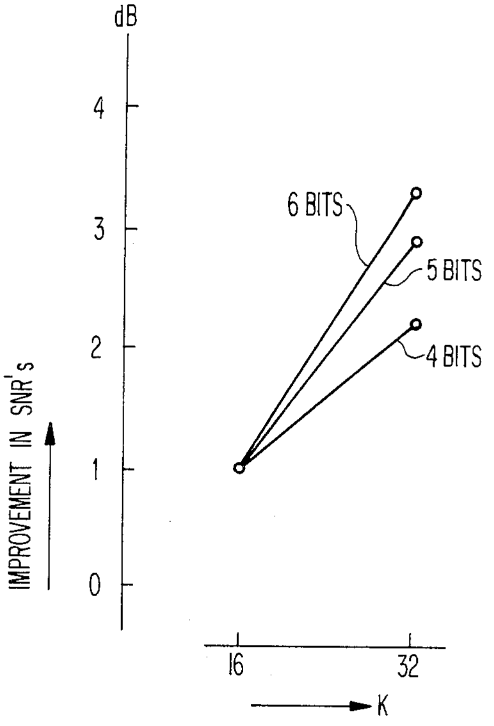
FIG. 6 shows several data for use in exemplifying the merits achieved by the coding device of FIG. 3.

Turning to FIG. 6, signal-to-noise ratios SNR's were measured for a low bit-rate speech coding device of the type illustrated with reference to FIGS. 3 and 4 and a like coding device according to the Ozawa et al patent application. In the manner depicted along the abscissa, sixteen and thirty-two were used as the predetermined positive integer K, namely, as the number of excitation pules in each segment. Frames were used as the respective segments. Each frame was 20 milliseconds long. Inprovements were achieved with this invention over the prior art in the signal-to-noise ratios. The improvements are shown in decibels (dB) by using a parameter representative of the number of quantization bits per unit element amplitude of the orthogonal sequence $\{y_k(n)\}$.

In conjunction with the coding device and the decoder illustrated with reference to FIGS. 3 through 6, each element amplitude $x_k$ may not necessarily be defined by Equation (17) but may be a function of the scalar product of the weighted segment $s_w(n)$ and the sequence element $y_k(n)$. For example, the element amplitude $x_k$ may be defined either by $\langle s_w(n), y_k(n)\rangle / |y_k(n)|$ or by $\langle s_w(n), y_k(n)\rangle / \langle y_k(n), y_k(n)\rangle$.

The weighted impulse response $h_w(n)$ exponentially decreases with an increase in the difference between two sampling instants n's in each segment. The correlation between a delayed impulse response and another delayed impulse response, such as $h_w(n-m_k)$ and $h_w(n-m_i)$, therefore has a negligible value when the difference $|m_k-m_i|$ is large. This makes it possible to approximate the weighted segment $s_w(n)$ by the orthogonal sequence $\{y_k(n)\}$ without rejecting or excluding the correlations between the delayed impulse responses, such as $h_w(n-m_k)$ and $h_w(n-m_i)$, in Equations (13) for large differences $|m_k-m_i|$ in the manner which will later be exemplified. When the rejection is carried out only for a few numbers of correlations, it is possible to reduce the amount of calculation to a great extent.

It is possible in the novel algorithm to use Equation (6) rather than Equation (10). In this event, the autocorrelation and the cross-correlation functions:

$$\phi_{hh}(m_i, m_j) = \langle h_w(n-m_i), h_w(n-m_j)\rangle$$

and $$\phi_{xh}(m_k) = \langle s_w(n), h_w(n-m_k)\rangle,$$

should preliminarily be calculated in the manner described in connection with FIG. 1. A set of simultaneous equations is derived from Equations (13) and (15) as follows:

$$\begin{bmatrix} \phi_{hh}(m_1, m_1) \ldots \phi_{hh}(m_1, m_K) \\ \phi_{hh}(m_2, m_1) \ldots \phi_{hh}(m_2, m_K) \\ \phi_{hh}(m_3, m_1) \ldots \phi_{hh}(m_3, m_K) \\ \cdot \\ \cdot \\ \phi_{hh}(m_K, m_1) \ldots \phi_{hh}(m_K, m_K) \end{bmatrix} = \begin{bmatrix} 1 & & & & 0 \\ \nu_{21} & 1 & & & \\ \nu_{31} & \nu_{32} & 1 & & \\ \cdot & & & & \\ \cdot & & & & \\ \nu_{K1} & \nu_{K2} & \nu_{K3} & \ldots & 1 \end{bmatrix} \times \tag{24}$$

$$\begin{bmatrix} d_1 & & & & 0 \\ & d_2 & & & \\ & & d_3 & & \\ & & & \cdot & \\ 0 & & & & d_K \end{bmatrix} \begin{bmatrix} 1 & \nu_{21} & \nu_{31} & \ldots & \nu_{K1} \\ & 1 & \nu_{32} & \ldots & \nu_{K2} \\ & & 1 & \ldots & \nu_{K3} \\ & & & & \cdot \\ 0 & & & & 1 \end{bmatrix},$$

where $d_k = \langle y_k(n), y_k(n)\rangle$. On the other hand, another set of simultaneous equations results from Equation (21) as follows:

$$\begin{bmatrix} 1 & & & & 0 \\ \nu_{21} & 1 & & & \\ \nu_{31} & \nu_{32} & 1 & & \\ \cdot & & & & \\ \cdot & & & & \\ \nu_{K1} & \nu_{K2} & \nu_{K3} & \ldots & 1 \end{bmatrix} \begin{bmatrix} x_1 \\ x_2 \\ x_3 \\ \cdot \\ \cdot \\ x_K \end{bmatrix} = \begin{bmatrix} \phi_{xh}(m_1) \\ \phi_{xh}(m_2) \\ \phi_{xh}(m_3) \\ \cdot \\ \cdot \\ \phi_{xh}(m_K) \end{bmatrix}. \tag{25}$$

In an excitation pulse sequence parameter producing circuit which is similar to the circuit 46, Equations (24) and (25) are used in determining the pulse instants $\{m_k\}$ and the element amplitudes $\{x_k\}$ in the manner described in the elder patent application. More particularly, the element amplitudes $x_k$'s used in the instant specification are in correspondence to the column vector elements $y_i$'s described in the elder patent application in connection with Equation (21) thereof. The pulse instants $\{m_k\}$ are therefore determined in accordance with Equations (24) and (25) of the elder patent application in correspondence to maximization of Formula (19) described heretobefore. The element amplitudes $\{x_k\}$ are calculated by Equations (22) and (23) of the elder patent application. In an excitation pulse amplitude calculator which corresponds to the calculator 71, the pulse amplitudes $\{g_k$56 of the respective excitation pulses are calculated by those Equations (28) and (29) of the elder patent application which are equivalent to Equations (23) of the present application.

In conjunction with the description thus far given, it is possible to divide each frame of the discrete pattern or speech signal sequence into a preselected number P of subframes. This reduces the amount of calculation to 1/P. Either of the frames and the subframes is referred to hereinabove as a segment. The segment may have a variable segment length, which is effective in raising the performance of the low bit-rate pattern coding device. The LSP parameters known in the art, may be substituted for the K parameters.

The weighting factor w(n) may not be used in the equations so far described. It will readily be understood in this event that the coding device need not comprise the weighting circuit 27. The segment s(n) should instead be delivered directly to the excitation pulse sequence parameter producing circuit 46 from the buffer memory 23. The impulse response calculator 28 should calculate the discrete impulse response sequence h(n) and deliver the same to the excitation pulse sequence parameter producing circuit 46.

Figure 7:
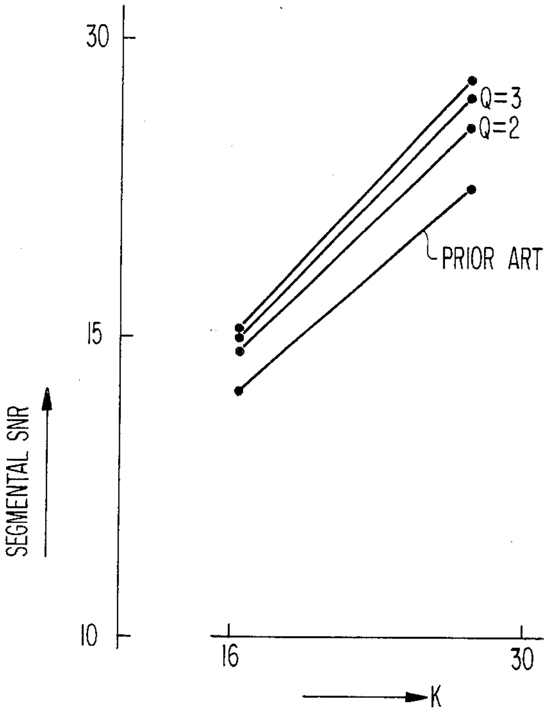
FIG. 7 shows a few characteristic lines for modifications of the coding device illustrated in FIG. 3.

Referring to FIG. 7, the segmental SNR was measured with only a few numbers Q of correlations used in Equations (13) Sixteen and thirty were used as the predetermined positive integer K. For comparison, a line is depicted at the top for a case where no correlations are rejected in Equations (13). Another line is drawn at the bottom to show the segmental SNR for the coding device according to the Ozawa et al patent application. Two intervening lines are for the few numbers Q which are equal to two and three as labelled.

Referring again to FIG. 3, a low bit-rate pattern or speech coding device according to a second embodiment of this invention will be described. The algorithm used in the excitation pulse sequence parameter producing circuit 46 is modified into a modified algorithm. According to the modified algorithm, a quantized element amplitude $\hat{x}_k$ is determined at first for each sequence element $y_k(n)$ of the orthogonal sequence $\{y_k(n)\}$ by quantizing a scalar product of the weighted segment $s_w(n)$ and the sequence element $y_k(n)$ in question. The pulse instant $m_k$ is subsequently determined in the manner which will presently be described.

The quantized element amplitudes $\hat{x}_k$'s and either the pulse instants $\hat{m}_k$'s or the quantized pulse instants $m_k$'s are collectively used as the excitation pulse (sequence) parameters. This astonishingly reduces the quantization error which is unavoidable according to the Ozawa et al patent application due to quantization of the pulse amplitudes $g_k$'s rather than the element amplitudes $x_k$'s after all pulse amplitudes $g_k$'s are determined. From a different view, this alleviates a great amount of information which must be assigned to the pulse amplitudes $g_k$'s according to Ozawa et al. Incidentally, operation of the excitation pulse amplitude calculator 71 (FIG. 5) is not different from that described heretobefore.

From Equations (13) and (17), the element amplitude $x_k$ is determined in accordance with:

$$x_k = \langle s_w(n), h_w(n-m_k)\rangle - \sum_{k=1}^{k-1} v_{ki}x_i.$$

When the quantized element amplitude $\hat{x}_k$ is used, Formula (19) becomes:

$$\left[\langle s_w(n), h_w(n-m_k)\rangle - \sum_{k=1}^{k-1} v_{ki}\hat{x}_i\right] \div \langle y_k(n), y_k(n)\rangle. \quad (26)$$

The excitation pulse parameters are determined in this manner with the pulse instant $m_k$ of each currently processed pulse of the excitation pulses optimally determined by Formula (26) in consideration of the pulse instants $m_1$ through $m_{k-1}$ of the previously processed pulses of the excitation pulses and the quantized element amplitudes $\hat{x}_1$ through $\hat{x}_{k-1}$.

Figure 8:
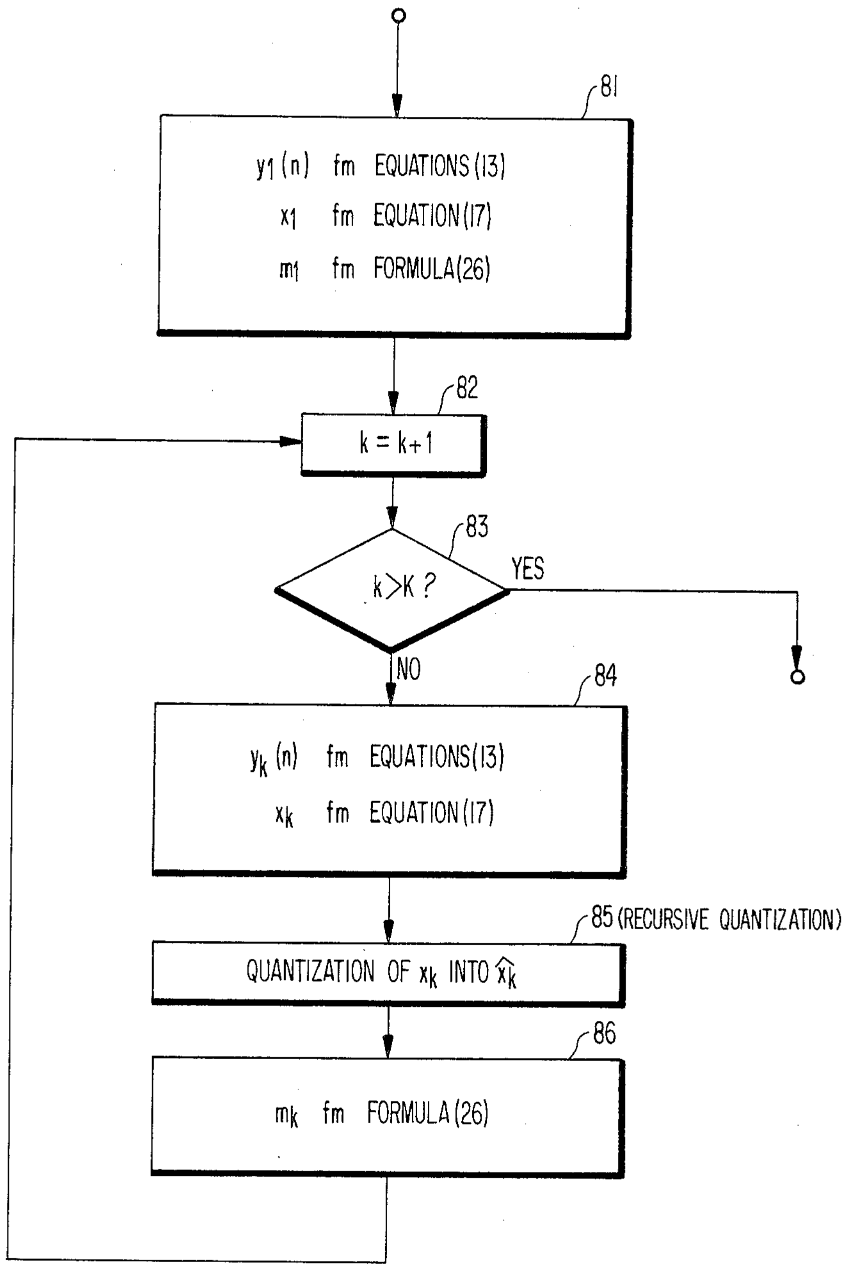
FIG. 8 is a flow chart for use in describing operation of an excitation pulse sequence parameter producing circuit which is used in a coding device according to a second embodiment of this invention.

Turning to FIG. 8, the excitation pulse sequence parameter producing circuit 46 is operable in compliance with the modified algorithm in the manner which is similar to that illustrated with reference to FIG. 4. At first step 81, Formula (26) is used rather than Formula (19) which is used in the first step 51 described in conjunction with FIG. 4. Second and third steps 82 and 83 are similar to the second and the third steps 52 and 53 of FIG. 4. At a fourth step 84, Formula (26) is used instead of Formula (19) used in the fourth step 84 of FIG. 4. A fifth step 85 follows at which the element amplitude $x_k$ of the currently processed pulse is quantized into the quantized element amplitude $\hat{x}_k$. At a sixth step 86, the pulse instant $m_k$ of the currently processed pulse is determined so as to maximize formula (26). The sixth step 86 proceeds back to the second step 82.

Various methods are applicable to quantization of the element amplitudes $\{x_k\}$. For example, a normalizing factor may be defined by the absolute value of the element amplitude $|x_1|$ of the first sequence element $y_1(n)$. The element amplitudes $x_k$'s of the second and subsequent sequence elements $y_2(n)$ and so forth are normalized by the normalizing factor and are successively uniformly quantized. As an alternate example, the element amplitude absolute value $|x_1|$ may be used as an initial value. A difference between the element amplitude absolute values $|x_k|$ and $|x_{k-1}|$ for two consecutive sequence elements is calculated for the ordinal numbers k's of 2 through K. The differences are successively quantized together with the signs.

In FIG. 3, the second or excitation pulse sequence coder 57 may code the pulse instants $\{m_k\}$ and the quantized element amplitudes $\{\hat{x}_k\}$ in the manner described before. The relation described in conjunction with Formula (19), likewise holds for Formula (26) and may be used on coding the pulse instants $m_k$'s and the quantized element amplitudes $\hat{x}_k$'s.

Figure 9:
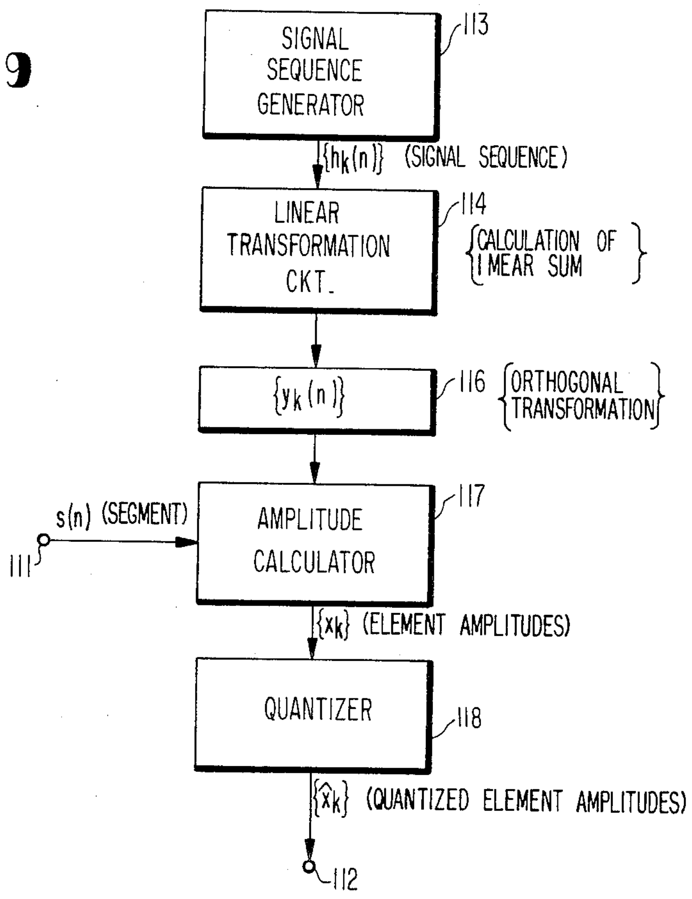
FIG. 9 is a block diagram of a speech coding device according to a third embodiment of this invention.

Referring now to FIG. 9, description will proceed to a low bit-rate pattern coding device according to a third embodiment of this invention. The coding device being illustrated, is operable in compliance with a somewhat different algorithm. The different algorithm is, however, equivalent to the novel and the modified algorithms which are thus far described. This will become clear as the description proceeds. A speech signal will again be used as a representative of the pattern signal.

The coding device has coder input and output terminals 111 and 112. Segments of a discrete speech signal sequence are successively supplied to the coder input terminal 111. An output code sequence is obtained at the coder output terminal 112. As before, each segment is derived from an original speech signal and will be designated by s(n). The output code sequence is supplied to a counterpart decoder as an input code sequence and is used in reproducing the original speech signal as a reproduced speech signal.

In the manner which will be understood from the description given in connection with Equation (1), the segment s(n) is given approximately as follows by a linear sum of first, . . . , k-th, . . . , and K-th discrete signals $[g_kh_k(n)]$'s:

$$s(n) = \sum_{k=1}^{K} g_kh_k(n) + e(n), \quad (27)$$

where e(n) represents a sequence of errors. Each discrete signal is given by a product of a signal amplitude $g_k$ and a signal sequence or element $h_k(n)$. The signal elements $h_k(n)$'s are preliminarily given independently of one another and are correspondent in the above-referenced Atal et al article to the discrete or the weighted impulse responses of different phases $h(n-m_k)$'s or $h_w(n-m_k)$'s. Incidentally, representation of the segment by the discrete impulse responses, or representation of the weighted segment by the weighted impulse responses, is equivalent to use of a sequence of excitation pulses.

In a conventional method of coding the segment s(n), the signal amplitudes $\{g_k\}$ are determined so as to minimize an error power J which the linear sum has relative to the segment. The error power J is defined by a mean square of the errors e(n) for each segment, namely, by:

$$J = \sum_{n=0}^{N-1}\left[s(n) - \sum_{k=1}^{K} g_kh_k(n)\right]^2, \quad (28)$$

which equation is similar to Equation (5). The signal amplitudes $\{g_k\}$ and the signal elements $\{h_k(n)\}$ are quantized into quantized signal amplitudes $\{\hat{g}_k\}$ and quantized signal elements $\{\hat{h}_k(n)\}$. The output code sequence consists of the quantized signal amplitudes and the quantized signal elements. In the decoder, a reproduced segment $\hat{s}(n)$ is obtained in accordance with:

$$\tilde{s}(n) = \sum_{k=1}^{K} \hat{g}_k \hat{h}_k(n). \quad (29)$$

The conventional method is defective because the quantized signal amplitudes $\hat{g}_k$'s have correlations when the signal elements $h_k(n)$'s have a certain degree of correlation. The correlations between the quantized signal amplitudes give rise to a quantization error which becomes serious depending on the degree of correlation.

According to the afore-mentioned different algorithm, a sequence or set of the signal elements $\{h_k(n)\}$ is transformed into an orthogonal sequence or set of first through K-th sequence or set elements $\{y_k(n)\}$ in the manner described in conjunctin with Equations (13). More specifically:

$$\left.\begin{array}{l} y_1(n) = h_1(n), \\ y_2(n) = h_2(n) - v_{21}y_1(n), \\ \ldots, \\ y_k(n) = h_k(n) - \sum_{i=1}^{k-1} v_{ki}y_i(n), \\ \text{and} \ldots, \end{array}\right\} \quad (30)$$

where $v_{ki}$ represents transformation coefficients defined by:

$$v_{ki} = \langle h_k(n), y_i(n)\rangle / \langle y_i(n), y_i(n)\rangle, \quad (31)$$

which definition is similar to the definition according to Equations (14).

When each sequence element $y_k(n)$ is multiplied by an element amplitude $x_k$ defined therefor into a product, the segment s(n) is approximated by a linear sum of the products $[x_k y_k(n)]$'s, namely, by:

$$s(n) = \sum_{k=1}^{K} x_k y_k(n) + e(n),$$

where the error sequence e(n) may be different from that used in Equation (27).

The element amplitudes $\{x_k\}$ are recursively determined so as to minimize the error power J. It is possible to understand that the element amplitudes $x_k$'s are determined so as to minimize a difference between the segment s(n) and the linear sum of the products $[x_k h_k(n)]$'s. At any rate, Equation (28) is rewritten into:

$$J = \sum_{n=0}^{N-1} \left[ s(n) - \sum_{k=1}^{K} x_k y_k(n) \right]^2, \quad (32)$$

which is minimized when the element amplitude $x_k$ is given for the k-th system or sequence element $y_k(n)$ by:

$$x_k = \langle s(s), y_k(n)\rangle. \quad (33)$$

In FIG. 9, the coding device comprises a signal sequence generator 113 for generating a system or set of signal sequences $\{h_k(n)\}$ in the manner described in connection with Equation (28). A linear transformation circuit 114 is for orthogonalizing the signal sequence system or set into an orthogonal system according to Equations (30). A block 116 represents the first through K-th system or sequence elements $\{y_k(n)\}$. Supplied with the segment s(n) from the coder input terminal 111, an amplitude calculator 117 calculates the element amplitudes $x_k$'s recursively in compliance with Equation (33).

Referring again to FIG. 4, the afore-described novel algorithm will be reviewed with the segment s(n) and the discrete impulse response h(n) used instead of the weighted segment $s_w(n)$ and the weighted discrete impulse response $h_w(n)$. In the manner described in connection with the Atal et al article, particularly the description of "Multo-Pulse Excitation Model" on pages 615 to 616, the number of excitation pulses may be equal to a predetermined positive integer K and determined in the manner known in the art. As before, let the k-th excitation pulse be the current excitation pulse and the i-th excitation pulses be the previous excitation pulses where i represents the integers between 1 and (k−1), both inclusive.

The first step 51 is already described in detail. In preparation for the fourth step 54, the (k−1)-th delayed impulse response $h(n-m_k-1)$ is calculated. At the fourth step 54, the k-th orthogonal set element $y_k(n)$ is calculated according to the k-th equation of Equations (13). The element amplitude $x_k$ of the k-th orothogonal set element $y_k(n)$ is calculated by Equation (17). It is now possible to proceed to the fifth step 55 where the pulse instant or location $m_k$ is determined by the k-th excitation pulse by maximizing Formula (19). It is now understood that the pulse locations $[m_k]$ are recursively determined by using the segment s(n) and the discrete impulse response h(n). On so doing, a set of delayed impulse responses $[h(n-m_k)]$ is recursively transformed into the orthogonal set $[y_k(n)]$. The amplitudes $[x_k]$ of the respective set elements $[y_k(n)]$ are recursively determined.

A quantizer 118 is for quantizing the element amplitudes $x_k$'s into quantized element amplitudes $\hat{x}_k$'s. Although not shown, a similar quantizer may be used in quantizing the sequence elements $y_k(n)$'s into quantized sequence elements $\hat{y}_k(n)$'s. Incidentally, the quantized sequence elements $\{\hat{y}_k(n)\}$ are conveniently obtained by quantizing the signal elements $\{h_k(n)\}$ at first into quantized signal elements $\{\hat{h}_k(n)\}$ and subsequently orthogonalizing the quantized signal elements $\{\hat{h}_k(n)\}$ into the quantized sequence elements $\{\hat{y}_k(n)\}$. The quantized element amplitudes $\hat{x}_k$'s and the quantized sequence elements $\hat{y}_k(n)$'s are delivered to the coder output terminal 112 collectively as the output code sequence.

Figure 10:
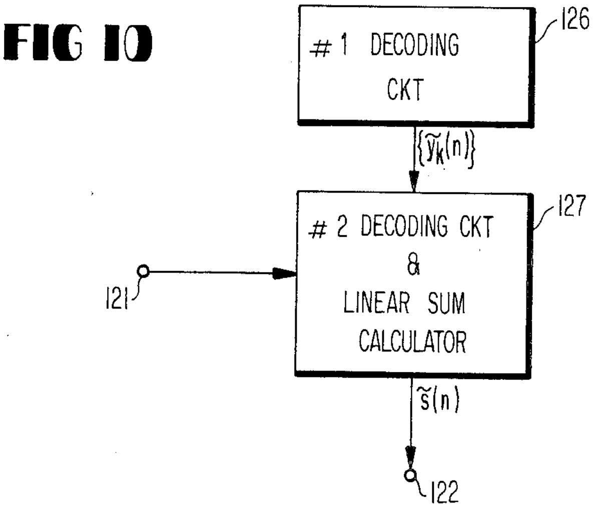
FIG. 10 is a block diagram of a decoder for use in combination with the coding device shown in FIG. 9.

Turning to FIG. 10, a decoder has a decoder input terminal 121 supplied with the output code sequence as na input code sequence from a counterpart coding device of the type illustrated with reference to FIG. 9. A reproduction of the original speech signal is delivered to a decoder output terminal 122 as a reproduced speech signal which is herein designated by the symbol $\bar{s}(n)$ used before for the reproduced segment. A first decoding circuit 126 decodes the quantized sequence elements $\hat{y}_k(n)$'s into a reproduced sequence of first through K-th sequence elements $\{\bar{y}_k(n)\}$. A second decoding circuit 127 is for decoding the quantized element amplitudes $\bar{x}_k$'s into a reproduced sequence of element amplitudes $\{\bar{x}_k\}$ and for thereafter calculating a linear sum of products of the sequence elements and the element amplitudes $[\bar{x}_k\bar{y}_k(n)]$'s of the respective reproduced sequences. The reproduced speech signal $\bar{s}(n)$ is given by the last-mentioned linear sum, namely, by:

$$\tilde{s}(n) = \sum_{k=1}^{K} \tilde{x}_k \tilde{y}_k(n),$$

which equation corresponds to Equation (29).

Alternatively, the above-mentioned signal amplitudes $\{g_k\}$ are related to the element amplitudes $\{x_k\}$ by:

$$\begin{pmatrix} g_1 \\ g_2 \\ g_3 \\ \cdot \\ \cdot \\ \cdot \\ g_K \end{pmatrix} = \begin{pmatrix} 1 & \nu_{21} & \nu_{31} & \ldots & \nu_{K1} \\ & 1 & \nu_{32} & \ldots & \nu_{K2} \\ & & 1 & \ldots & \nu_{K3} \\ & & & & \cdot \\ & & & & \cdot \\ & 0 & & & \cdot \\ & & & & 1 \end{pmatrix} \times \begin{pmatrix} x_1/<y_1(n), y_1(n)> \\ x_2/<y_2(n), y_2(n)> \\ x_3/<y_3(n), y_3(n)> \\ \cdot \\ \cdot \\ \cdot \\ x_K/<y_K(n), y_K(n)> \end{pmatrix}, \quad (34)$$

which equations are correspondent to Equations (23). It is therefore possible to calculate the signal amplitudes $g_k$'s as calculated signal amplitudes $\bar{g}_k$'s by using the quantized sequence elements $\bar{y}_k(n)$'s and the quantized element amplitudes $\bar{x}_k$'s of the reproduced sequences as the sequence elements $y_k(n)$'s and the element amplitudes $x_k$'s used in Equations (31) and (34). In this event, the reproduced speech signal $\bar{s}(n)$ is given by:

$$\tilde{s}(n) = \sum_{k=1}^{K} \tilde{g}_k h_k(n). \quad (35)$$

Figure 11:
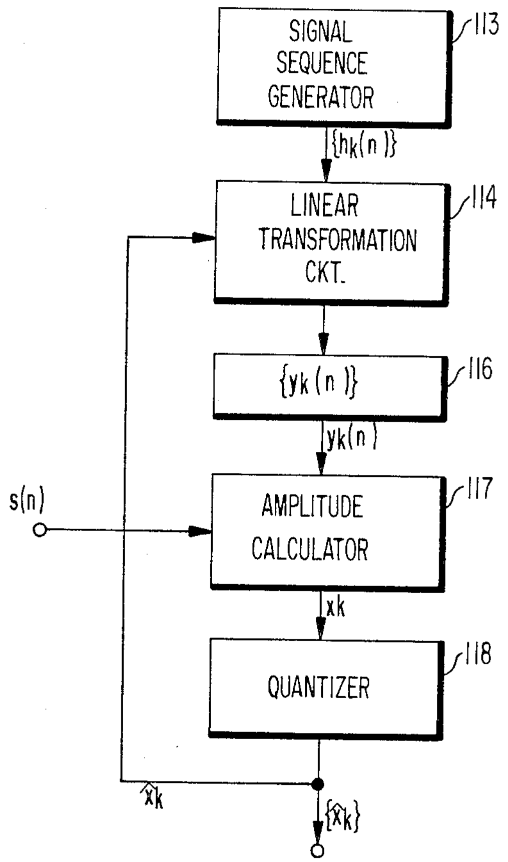
FIG. 11 is a block diagram of a modification of the coding device illustrated in FIG. 9.
Figure 12:
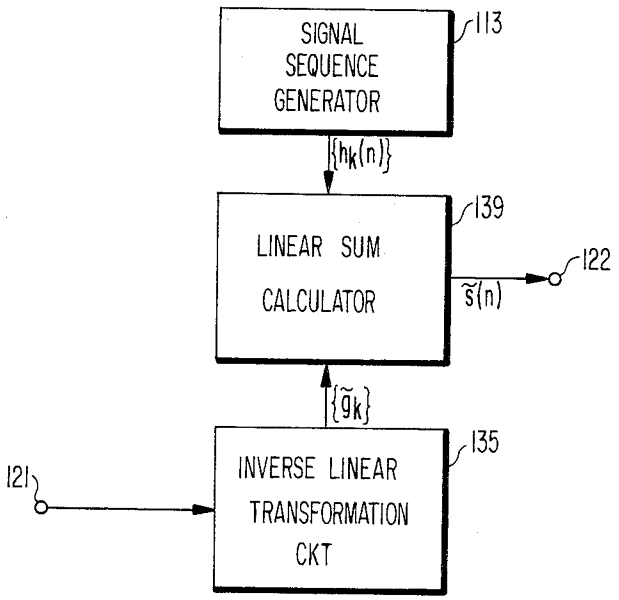
FIG. 12 is a block diagram of a decoder for use as a counterpart of the coding device depicted in FIG. 11.

Referring to FIGS. 11 and 12, description will be given as regards a modification of the coding device illustrated with reference to FIG. 9 and a decoder which may be used as a counterpart of the coding device depicted in FIG. 11. The modification is operable like the coding device illustrated with reference to FIGS. 3 and 8. The decoder may be used in combination with the coding device illustrated with reference to FIG. 9. Similar parts are designated by like reference numerals.

In FIG. 11, the linear transformation circuit 114 is supplied with the quantized element amplitudes $\{\hat{x}_k\}$. This is in order to get the k-th sequence element $y_k(n)$ after the element amplitudes $x_k$'s are quantized for the first through the (k−1)-th sequence elements $y_1(n)$ to $y_{k-1}(n)$ into the quantized element amplitudes $\hat{x}_k$'s. In the manner described in conjunction with FIGS. 2 and 8, the quantization error is further reduced.

In FIG. 12, the signal sequence generator 113 of the above-described type is used in generating the signal sequence system $\{h_k(n)\}$. Supplied with the input code sequence from the decoder input terminal 121, an inverse linear transformation circuit 135 calculates the calculated signal amplitudes $\bar{g}_k$'s in accordance with Equations (34). A linear sum calculator 139 calculates the reproduced sequence $\bar{s}(n)$ according to Equation (35) and delivers the same to the decoder output terminal 122.

Reviewing FIGS. 9 through 12, a weighted segment $s_w(n)$ may be supplied to the coder input terminal 111. In this event, the discrete signal generator 113 should generate a sequence of weighted discrete signals, which are adjusted in consideration of sensual effects and may be designated by $h_{wk}(n)$.

What is claimed is:

1. A method of coding each segment of a discrete pattern signal sequence derived from an original pattern signal into an output code sequence consisting of a first and a second code sequence, said second code sequence being equivalent to a sequence of codes representative of a predetermined number of excitation pulses, respectively, which are for use in reproducing said original pattern signal by exciting a synthesizing filter and which have pulse locations in said segment, respectively, said method comprising the steps of:

using said segment in calculating a first parameter sequence of reflection coefficients;

coding said first parameter sequence into said first code sequence;

using said first parameter sequence in calculating the discrete impulse response of said synthesizing filter;

using said segment and said discrete impulse response in recursively determining said pulse locations by recursively producing a set of delayed impulse responses with said discrete impulse responses given delays which are equal to the respective pulse locations, by recursively transforming said set of delayed impulse responses into an orthogonal set of set elements which are equal in number to said excitation pulses and for which element amplitudes are defined, respectively, and to recursively determining said element amplitudes;

using the recursively determined pulse locations and the recursively determined element amplitudes collectively as a second parameter sequence; and coding said second parameter sequence into said second code sequence.

2. The method of coding as recited in claim 1, wherein the step of recursively determining said pulse locations includes quantizing the recursively determined element amplitudes into quantized element amplitudes.

3. The method of coding as recited in claim 2 further including the steps of:

using said segment and said first parameter sequence in calculating a discrete segment which is weighted in consideration of a frequency characteristic of said synthesizing filter, and calculating a discrete impulse response that is weighted in consideration of said frequency characteristic, and using said weighted impulse response and said weighted segment in said recursive determination of pulse locations.

4. The method of coding as recited in claim 1 further including the steps of:

using said segment and said first parameter sequence in calculating a discrete segment which is weighted in consideration of a frequency characteristic of said synthesizing filter, and calculating a discrete impulse response that is weighted in consideration of said frequency characteristic and using said weighted impulse response and said weighted segment in said recursive determination of pulse locations.

5. A method of coding each segment of an original pattern signal into an output code sequence, said method comprising the steps of:

generating a predetermined number of signal sequences which can be used in approximating said segment by a linear sum of discrete signals given by multiplying said signal sequences by signal amplitudes defined therefor, respectively;

transforming a set of said signal sequences into an orthogonal set of set elements which are equal in number to said signal sequences and for which element amplitudes are defined, respectively;

using said segment and said orthogonal sequences in recursively determining said element amplitudes so as to minimize a difference between said segment and a linear sum of products which are given by multiplying said set elements by the recursively determined element amplitudes, respectively;

quantizing the recursively determined element amplitudes and said set elements into quantized element amplitudes and quantized system elements; and using said quantized element amplitudes and said quantized set elements collectively as said output code sequence.

6. A method of decoding an input code sequence consisting of a first and a second code sequence into a reproduced pattern signal, said second code sequence being equivalent to a sequence of codes representative of a predetermined number of excitation pulses, respectively, which are for use in reproducing a segment of an original pattern signal as said reproduced pattern signal by exciting a synthesizing filter and each of which has a pulse instant in said segment and a pulse amplitude, said first and said second code sequences being produced by:

using said segment in calculating a first parameter sequence of reflection coefficients;

coding said first parameter sequence into said first code sequence;

using said first parameter sequence in calculating the discrete impulse response of said synthesizing filter;

using said segment and said discrete impulse response in recursively determining said pulse locations by recursively producing a set of delayed impulse responses with said discrete impulse response given delays which are equal to the respective pulse locations, by recursively transforming said set of delayed impulse responses into an orthogonal set of elements which are equal in number of said excitation pulses and for which element amplitudes are defined, respectively, and by recursively determining said element amplitudes;

using the recursively determined pulse locations and the recursively determined element amplitudes collectively as a second parameter sequence; and coding said second parameter sequence into said second code sequence;

said method comprising the steps of:

decoding said first code sequence into a reproduction of said first parameter sequence;

using said reproduction of said first parameter sequence in calculating a reproduction of said discrete impulse response;

decoding said second code sequence into reproductions of said pulse locations and reproductions of said element amplitudes;

using said reproduction of said discrete impulse response, said reproductions of pulse locations, and said reproductions of element amplitudes in calculating calculated amplitudes which correspond to the pulse amplitudes of the respective excitation pulses; and using said reproduction of said first parameter sequence in defining said synthesizing filter and using said reproductions of pulse locations and said calculated amplitudes in producing said reproduced pattern signal by exciting the synthesizing filter defined by said reproduction of said first parameter sequence.

7. The method of coding as recited in claim 6 further including the steps of:

using said segment and said first parameter sequence in calculating a discrete segment which is weighted in consideration of a frequency characteristic of said synthesizing filter, and calculating a discrete impulse response that is weighted in consideration of said frequency characteristic, and using said weighted impulse response and said weighted segment in said recursive determination of pulse locations.

8. A method of decoding an input code sequence consisting of a first and a second code sequence into a reproduced pattern signal, said second code sequence being equivalent to a sequence of codes representative of a predetermined number of excitation pulses, respectively, which are for use in reproducing a segment of an original pattern signal as said reproduced pattern signal by exciting a synthesizing filter and each of which has a pulse location in said segment and a pulse amplitude, said first and said second code sequences being produced by:

using said segment in calculating a first parameter sequence of reflection coefficients;

coding said first parameter sequence into said first code sequence;

using said first parameter sequence in calculating the discrete impulse response of said synthesizing filter;

using said segment and said discrete impulse response in recursively determining said pulse locations by recursively producing a set of delayed impulse responses with said discrete impulse response given delays, which are equal to the respective pulse locations, by recursively transforming said set of delayed impulse responses into an orthogonal set of set elements which are equal in number to said excitation pulses and for which element amplitudes are defined, respectively, and by recursively determining said element amplitudes, and by quantizing the recursively determined element amplitudes into quantized element amplitudes;

using the recursively determined pulse locations and said quantized element amplitudes collectively as a second parameter sequence; and coding said second parameter sequence into said second code sequence;

said method comprising the steps of:

decoding said first code sequence into a reproduction of said first parameter sequence;

using said reproduction of first parameter sequence in calculating a reproduction of said discrete impulse response;

decoding said second code sequence into reproductions of said pulse locations and reproductions of said element amplitudes;

using said reproduction of said discrete impulse response, said reproductions of said pulse locations, and said reproductions of element amplitudes in calculating calculated amplitudes which correspond to the pulse amplitudes of the respective excitation pulses; and using said reproduction of said first parameter sequence in defining said synthesizing filter and using said reproductions of pulse locations and said calculated amplitudes in producing said reproduced pattern signal by exciting the synthesizing filter defined by said reproduction of said first parameter sequence.

9. The method of coding as recited in claim 8 wherein:

the step of recursively determining said pulse locations includes quantizing the recursively determined element amplitude into quantized element amplitudes; and the method includes the further steps of:

using said segment and said first parameter sequence in calculating a discrete segment which is weighted in consideration of a frequency characteristic of said synthesizing filter, and calculating a discrete impulse response that is weighted in consideration of said frequency characteristic, and using said weighted impulse response and said weighted segment in said recursive determination of pulse locations.

10. A method of decoding an input code sequence into a reproduced pattern signal, said input code sequence being produced by coding each segment of an original pattern signal into an output code sequence by:

generating a predetermined number of signal sequences which can be used in approximating said segment by a linear sum of discrete signals given by multiplying said signal sequences by signal amplitudes defined therefor, respectively;

transforming a set of said signal sequences into an orthogonal set of set elements which are equal in number to said signal sequences and for which element amplitudes are defined, respectively;

using said segment and said set of orthogonal sequences in recursively determining said element amplitudes so as to minimize a difference between said segment and a linear sum of products which are given by multiplying said set elements by the recursively determined element amplitudes, respectively;

quantizing the recursively determining element amplitudes and said set elements into quantized element amplitudes and quantized set elements; and using said quantized element amplitudes and said quantized set elements collectively as said output code sequence;

said method comprising the steps of:

decoding said quantized set elements into reproductions of said set elements;

decoding said quantized element amplitudes into reproductions of said element amplitudes; and using said reproductions of system elements and said reproductions of element amplitudes in producing a reproduction of said linear sum of products as said reproduced pattern signal.

11. A device for coding each segment of an original pattern signal into an output code sequence, said device comprising:

means for generating a predetermined number of signal sequences which can be used in approximating said segment by a linear sum of discrete signals given by multiplying said signal sequences by signal amplitudes defined therefor, respectively;

means for transforming a set of said signal sequences into an orthogonal set of set elements which are equal in number to said signal sequences and for which element amplitudes are defined, respectively;

means responsive to said segment and said orthogonal set for recursively determining said element amplitudes so as to minimize a difference between said segment and a linear sum of products which are given by multiplying said set elements by the recursively determined element amplitudes, respectively; and means for producing said output code sequence by quantizing the recursively determined element amplitudes and said set elements into quantized element amplitudes and quantized set elements.

* * * * *